US010252181B2

(12) United States Patent
Beetz et al.

(10) Patent No.: US 10,252,181 B2
(45) Date of Patent: Apr. 9, 2019

(54) ULTRAHIGH EFFICIENCY SPRAY DRYING APPARATUS AND PROCESS

(71) Applicant: ZoomEssence, Inc., Hebron, KY (US)

(72) Inventors: Charles Pershing Beetz, Erlanger, KY (US); Jason Andrew Beetz, California, KY (US)

(73) Assignee: ZOOMESSENCE, INC., Hebron, KY (US)

( * ) Notice: Subject to any disclaimer, the term of this patent is extended or adjusted under 35 U.S.C. 154(b) by 0 days.

(21) Appl. No.: 16/055,075

(22) Filed: Aug. 4, 2018

(65) Prior Publication Data

US 2019/0038994 A1 Feb. 7, 2019

Related U.S. Application Data

(63) Continuation-in-part of application No. 16/005,302, filed on Jun. 11, 2018, which is a continuation-in-part (Continued)

(51) Int. Cl.
*B01D 1/18* (2006.01)
*B01J 2/04* (2006.01)

(Continued)

(52) U.S. Cl.
CPC *B01D 1/18* (2013.01); *B01J 2/04* (2013.01); *B01J 2/16* (2013.01); *B05B 5/032* (2013.01); *F26B 5/065* (2013.01)

(58) Field of Classification Search
None
See application file for complete search history.

(56) References Cited

U.S. PATENT DOCUMENTS 1,829,477 A 10/1925 Douthitt
2,287,995 A 6/1942 Haugh (Continued)

FOREIGN PATENT DOCUMENTS

AU 549614 B2 2/1986
CA 1162699 A 2/1984

(Continued)

OTHER PUBLICATIONS

Bailey, A., “Electrostatic Spraying of Liquids”, Apr. 1988, pp. 1-35, Publisher: Research Studies Press Ltd., Published in: Taunton, Somerset, England.

(Continued)

*Primary Examiner* — Mary Lynn F Theisen

(74) *Attorney, Agent, or Firm* — Hultquist, PLLC; Steven J. Hultquist

(57) ABSTRACT

The disclosure relates to ultrahigh efficiency spray drying systems and processes, utilizing induction of localized turbulence in a drying fluid flow stream to produce spray dried product, having particular utility for low temperature spray drying operations. In a specific implementation, a method of processing a spray dryable liquid composition to form a spray dried product includes the steps of: generating a spray of the spray dryable liquid composition; contacting the spray of spray dryable liquid composition in a spray drying contact zone with a stream of primary drying fluid; injecting pressurized secondary drying fluid into the stream of primary drying fluid in the spray drying contact zone at multiple loci thereof to provide localized turbulence at said multiple loci; and recovering the spray dried product from the spray drying contact zone. Systems of the present disclosure are effective in achieving high-rate production of dry powder spray dried products, with substantially reduced capital equipment costs, energy requirements, and operating expenditures.

30 Claims, 12 Drawing Sheets
(3 of 12 Drawing Sheet(s) Filed in Color)

Related U.S. Application Data of application No. 15/865,657, filed on Jan. 9, 2018, now Pat. No. 9,993,787, which is a continuation-in-part of application No. 15/668,832, filed on Aug. 4, 2017, now Pat. No. 9,861,945.

(51) Int. Cl.
*B05B 5/03* (2006.01)
*B01J 2/16* (2006.01)
*F26B 5/06* (2006.01)

(56) References Cited

U.S. PATENT DOCUMENTS

| | | | |
|---|---|---|---|
| 2,326,142 | A | 8/1943 | Hall |
| 2,884,049 | A | 4/1959 | Barzelay |
| 2,911,036 | A | 11/1959 | Lazar et al. |
| 2,954,293 | A | 9/1960 | Rusoff |
| 3,554,768 | A | 1/1971 | Feldman |
| 3,615,723 | A | 10/1971 | Meade et al. |
| 3,655,397 | A | 4/1972 | Parliment et al. |
| 3,677,321 | A | 7/1972 | Felstead |
| 3,679,416 | A | 7/1972 | Reich |
| 3,740,865 | A | 6/1973 | Laguilharre |
| 3,741,273 | A | 6/1973 | Meade |
| 3,805,869 | A | 4/1974 | Winter et al. |
| 3,817,308 | A | 6/1974 | Bundo |
| 3,840,996 | A | 10/1974 | Grindstaff et al. |
| 3,844,969 | A | 10/1974 | Griffiths et al. |
| 3,886,297 | A | 5/1975 | Parliment et al. |
| 3,920,815 | A | 11/1975 | Harvey et al. |
| 3,956,521 | A | 5/1976 | Pisecky et al. |
| 3,962,321 | A | 6/1976 | Parliment et al. |
| 3,962,384 | A | 6/1976 | Cannalonga et al. |
| 3,963,559 | A | 6/1976 | Petersen et al. |
| 3,966,975 | A | 6/1976 | Hansen et al. |
| 4,001,437 | A | 1/1977 | Jaeggi et al. |
| 4,032,465 | A | 6/1977 | Bauer et al. |
| 4,062,641 | A | 12/1977 | Hovmand et al. |
| 4,070,766 | A | 1/1978 | Kamphuis |
| 4,072,570 | A | 2/1978 | Williams |
| 4,099,982 | A | 7/1978 | Hansen et al. |
| 4,141,783 | A | 2/1979 | Pisecky et al. |
| 4,198,308 | A | 4/1980 | Micciche |
| 4,226,670 | A | 10/1980 | Ferguson et al. |
| 4,261,793 | A | 4/1981 | Nakamura et al. |
| 4,276,312 | A | 6/1981 | Merritt |
| 4,281,024 | A | 7/1981 | Hauberg et al. |
| 4,302,481 | A | 11/1981 | Ribnitz et al. |
| 4,362,273 | A | 12/1982 | Seino et al. |
| 4,420,442 | A | 12/1983 | Sands |
| 4,422,900 | A | 12/1983 | Bordelon et al. |
| 4,438,147 | A | 3/1984 | Hedrick, Jr. |
| 4,476,042 | A | 10/1984 | Sprecker et al. |
| 4,476,147 | A | 10/1984 | Hall et al. |
| 4,481,221 | A | 11/1984 | Mookherjee et al. |
| 4,481,224 | A | 11/1984 | Muralidhara et al. |
| 4,490,403 | A | 12/1984 | Pisecky et al. |
| 4,493,750 | A | 1/1985 | Olmsted et al. |
| 4,511,592 | A | 4/1985 | Percel et al. |
| 4,515,987 | A | 5/1985 | Boden et al. |
| 4,520,032 | A | 5/1985 | Hall et al. |
| 4,521,613 | A | 6/1985 | Pittet et al. |
| 4,521,634 | A | 6/1985 | Fujioka et al. |
| 4,522,765 | A | 6/1985 | Wiegers et al. |
| 4,524,010 | A | 6/1985 | Reuter et al. |
| 4,525,364 | A | 6/1985 | Wiegers et al. |
| 4,532,145 | A | 7/1985 | Saleeb et al. |
| 4,532,364 | A | 7/1985 | Fujioka et al. |
| 4,535,192 | A | 8/1985 | Hall et al. |
| 4,537,704 | A | 8/1985 | Sprecker et al. |
| 4,539,143 | A | 9/1985 | Boden et al. |
| 4,539,209 | A | 9/1985 | Wilson et al. |
| 4,544,775 | A | 10/1985 | Fujioka et al. |
| 4,548,821 | A | 10/1985 | Hall et al. |
| 4,552,770 | A | 11/1985 | Pittet et al. |
| 4,565,707 | A | 1/1986 | Pittet et al. |
| 4,568,538 | A | 2/1986 | Boden et al. |
| 4,571,344 | A | 2/1986 | Pittet et al. |
| 4,600,576 | A | 7/1986 | Pittet et al. |
| 4,613,511 | A | 9/1986 | Pittet et al. |
| 4,614,831 | A | 9/1986 | Sprecker et al. |
| 4,619,780 | A | 10/1986 | Fujioka et al. |
| 4,620,945 | A | 11/1986 | Mookherjee et al. |
| 4,623,538 | A | 11/1986 | Pittet et al. |
| 4,623,547 | A | 11/1986 | Pittet et al. |
| 4,626,440 | A | 12/1986 | Pittet et al. |
| 4,629,586 | A | 12/1986 | Wilson et al. |
| 4,629,805 | A | 12/1986 | Sprecker et al. |
| 4,632,831 | A | 12/1986 | Hall |
| 4,643,903 | A | 2/1987 | Sprecker et al. |
| 4,661,281 | A | 4/1987 | Seiter et al. |
| 4,677,207 | A | 6/1987 | Boden et al. |
| 4,679,733 | A | 7/1987 | Lipp |
| 4,680,142 | A | 7/1987 | Pittet et al. |
| 4,681,976 | A | 7/1987 | Sprecker et al. |
| 4,702,799 | A | 10/1987 | Tuot |
| 4,724,121 | A | 2/1988 | Weyand |
| 4,762,636 | A | 8/1988 | Balliello et al. |
| 4,794,193 | A | 12/1988 | Pittet et al. |
| 4,804,496 | A | 2/1989 | Lowery et al. |
| 4,840,801 | A | 6/1989 | Mookherjee et al. |
| 4,849,125 | A | 7/1989 | Seiter et al. |
| 4,865,853 | A | 9/1989 | Mookherjee et al. |
| 4,873,112 | A | 10/1989 | Mitchell et al. |
| 4,883,884 | A | 11/1989 | Boden et al. |
| 4,892,910 | A | 1/1990 | Klesse et al. |
| 4,931,203 | A | 6/1990 | Ahmed et al. |
| 4,936,901 | A | 6/1990 | Surgant et al. |
| 4,950,495 | A | 8/1990 | Boden et al. |
| 4,962,089 | A | 10/1990 | Boden et al. |
| 4,983,579 | A | 1/1991 | Boden et al. |
| 5,004,618 | A | 4/1991 | Buckholz, Jr. et al. |
| 5,067,655 | A | 11/1991 | Farago et al. |
| 5,094,860 | A | 3/1992 | Newhall et al. |
| 5,100,509 | A | 3/1992 | Pisecky et al. |
| 5,124,162 | A | 6/1992 | Boskovic et al. |
| 5,130,149 | A | 7/1992 | Keller et al. |
| 5,137,741 | A | 8/1992 | Zampino et al. |
| 5,153,011 | A | 10/1992 | Patel et al. |
| 5,196,219 | A | 3/1993 | Hsu et al. |
| 5,227,017 | A | 7/1993 | Tanaka et al. |
| 5,338,553 | A | 8/1994 | Johnson et al. |
| 5,354,742 | A | 10/1994 | Deming et al. |
| 5,391,647 | A | 2/1995 | Yamamoto et al. |
| 5,443,829 | A | 8/1995 | Kensil et al. |
| 5,445,839 | A | 8/1995 | Hagiwara et al. |
| 5,462,978 | A | 10/1995 | Penzel et al. |
| 5,506,353 | A | 4/1996 | Subramaniam |
| 5,525,367 | A | 6/1996 | King et al. |
| 5,593,715 | A | 1/1997 | Christensen |
| 5,596,817 | A | 1/1997 | Hansen et al. |
| 5,702,749 | A | 12/1997 | Sugiura et al. |
| 5,723,424 | A | 3/1998 | Jennings |
| 5,759,599 | A | 6/1998 | Wampler et al. |
| 5,773,061 | A | 6/1998 | Getler et al. |
| 5,786,017 | A | 7/1998 | Blake et al. |
| 5,840,360 | A | 11/1998 | Larsen |
| 5,891,473 | A | 4/1999 | Stanier |
| 5,968,575 | A | 10/1999 | Rasmussen |
| 6,048,565 | A | 4/2000 | Getler et al. |
| 6,058,624 | A | 5/2000 | Bach et al. |
| 6,077,543 | A | 6/2000 | Gordon et al. |
| 6,200,949 | B1 | 3/2001 | Reijmer et al. |
| 6,237,247 | B1 | 5/2001 | Van Den Meersche |
| 6,251,463 | B1 | 6/2001 | Rossy et al. |
| 6,253,463 | B1 | 7/2001 | Hansen |
| 6,325,859 | B1 | 12/2001 | De Roos et al. |
| 6,335,045 | B1 | 1/2002 | Peters et al. |
| 6,387,431 | B1 | 5/2002 | Gautschi |
| 6,391,361 | B1 | 5/2002 | Peters et al. |
| RE37,860 | E | 9/2002 | Blake et al. |
| 6,474,573 | B1 | 11/2002 | Kelly |
| 6,482,433 | B1 | 11/2002 | DeRoos et al. |
| 6,497,911 | B1 | 12/2002 | Hansen et al. |

(56) References Cited

U.S. PATENT DOCUMENTS

| | | | |
|---|---|---|---|
| 6,560,897 | B2 | 5/2003 | Chickering et al. |
| 6,582,728 | B1 | 6/2003 | Platz et al. |
| 6,607,771 | B2 | 8/2003 | Benczedi et al. |
| 6,607,778 | B2 | 8/2003 | Mutka et al. |
| 6,608,017 | B1 | 8/2003 | Dihora et al. |
| 6,649,267 | B2 | 11/2003 | Agawa et al. |
| 6,652,898 | B2 | 11/2003 | Jensen |
| 6,656,394 | B2 | 12/2003 | Kelly |
| 6,689,755 | B1 | 2/2004 | Gabel et al. |
| 6,723,359 | B2 | 4/2004 | Subramaniam et al. |
| 6,734,158 | B2 | 5/2004 | Starkenmann |
| 6,763,607 | B2 | 7/2004 | Beyerinck et al. |
| 6,769,200 | B2 | 8/2004 | Raehse et al. |
| 6,838,100 | B2 | 1/2005 | Jaeger et al. |
| 6,902,751 | B1 | 6/2005 | Schleifenbaum et al. |
| 6,929,814 | B2 | 8/2005 | Bouwmeesters et al. |
| 6,933,265 | B2 | 8/2005 | Marty |
| 6,962,006 | B2 | 11/2005 | Chickering, III et al. |
| 6,964,385 | B2 | 11/2005 | Kelly |
| 7,022,665 | B2 | 4/2006 | Decorzant et al. |
| 7,090,832 | B2 | 8/2006 | Zanone et al. |
| 7,097,872 | B2 | 8/2006 | Dewis et al. |
| 7,128,936 | B1 | 10/2006 | Hansen |
| 7,176,176 | B2 | 2/2007 | Pickenhagen et al. |
| 7,176,177 | B2 | 2/2007 | Lambrecht et al. |
| 7,204,998 | B2 | 4/2007 | Holzner et al. |
| 7,252,848 | B2 | 8/2007 | Gelin |
| 7,316,826 | B2 | 1/2008 | Kindel et al. |
| 7,332,468 | B2 | 2/2008 | Widder et al. |
| 7,348,035 | B2 | 3/2008 | Schleifenbaum et al. |
| 7,361,376 | B2 | 4/2008 | Dewis et al. |
| 7,378,121 | B2 | 5/2008 | Ley et al. |
| 7,534,460 | B2 | 5/2009 | Dewis et al. |
| 7,651,713 | B2 | 1/2010 | Keller |
| 8,003,147 | B1 | 8/2011 | Nelson et al. |
| 8,939,388 | B1 | 1/2015 | Beetz et al. |
| 9,332,776 | B1 | 5/2016 | Beetz et al. |
| 9,861,945 | B1 | 1/2018 | Beetz et al. |
| 9,993,787 | B1 | 6/2018 | Beetz et al. |
| 2002/0187221 | A1 | 12/2002 | Tanaka et al. |
| 2003/0003212 | A1 | 1/2003 | Chien et al. |
| 2003/0021883 | A1 | 1/2003 | Skiff |
| 2003/0075012 | A1 | 4/2003 | Knunz et al. |
| 2003/0082272 | A1 | 5/2003 | Bouwmeesters et al. |
| 2003/0192815 | A1 | 10/2003 | Kelly |
| 2003/0196957 | A1 | 10/2003 | Henningfield et al. |
| 2003/0205629 | A1 | 11/2003 | Kelly |
| 2004/0062845 | A1 | 4/2004 | Krawczyk et al. |
| 2004/0253343 | A1 | 12/2004 | Ha et al. |
| 2005/0031769 | A1 | 2/2005 | Watanabe et al. |
| 2005/0051917 | A1 | 3/2005 | Grothe et al. |
| 2005/0209443 | A1 | 9/2005 | Bolen et al. |
| 2005/0282728 | A1 | 12/2005 | Narula et al. |
| 2006/0035008 | A1 | 2/2006 | Virgallito et al. |
| 2006/0159818 | A1 | 7/2006 | Kunieda |
| 2006/0264130 | A1 | 11/2006 | Karles et al. |
| 2007/0054837 | A1 | 3/2007 | Weiss et al. |
| 2007/0078071 | A1 | 4/2007 | Lee et al. |
| 2007/0117727 | A1 | 5/2007 | Narula et al. |
| 2007/0166185 | A1 | 7/2007 | Bartels |
| 2007/0184163 | A1 | 8/2007 | Toth et al. |
| 2007/0218012 | A1 | 9/2007 | Bittorf et al. |
| 2007/0218179 | A1 | 9/2007 | Ott et al. |
| 2007/0231424 | A1 | 10/2007 | Castro et al. |
| 2007/0297993 | A1 | 12/2007 | Kindel et al. |
| 2008/0008801 | A1 | 1/2008 | Barnekow et al. |
| 2008/0015264 | A1 | 1/2008 | Schleifenbaum et al. |
| 2008/0057175 | A1 | 3/2008 | Barnekow et al. |
| 2008/0063747 | A1 | 3/2008 | Boghani et al. |
| 2008/0064625 | A1 | 3/2008 | Holscher |
| 2008/0081779 | A1 | 4/2008 | Holscher |
| 2008/0107786 | A1 | 5/2008 | Barnekow et al. |
| 2008/0113073 | A1 | 5/2008 | Ley et al. |
| 2008/0199592 | A1 | 8/2008 | Fexer et al. |
| 2008/0214675 | A1 | 9/2008 | Ley et al. |
| 2008/0220140 | A1 | 9/2008 | Ley et al. |
| 2008/0227866 | A1 | 9/2008 | Ley et al. |
| 2008/0241322 | A1 | 10/2008 | Bunge |
| 2008/0242585 | A1 | 10/2008 | Ott et al. |
| 2008/0242740 | A1 | 10/2008 | Ley et al. |
| 2008/0292763 | A1 | 11/2008 | Looft et al. |
| 2008/0305052 | A1 | 12/2008 | Ley et al. |
| 2008/0317923 | A1 | 12/2008 | Ley et al. |
| 2009/0048206 | A1 | 2/2009 | Watanabe et al. |
| 2009/0081140 | A1 | 3/2009 | Brocke et al. |
| 2009/0091049 | A1 | 4/2009 | Nielsen |
| 2009/0092725 | A1 | 4/2009 | Panten et al. |
| 2009/0110796 | A1 | 4/2009 | Backes et al. |
| 2009/0124701 | A1 | 5/2009 | Langer et al. |
| 2009/0155445 | A1 | 6/2009 | Le et al. |
| 2009/0155446 | A1 | 6/2009 | Reiss et al. |
| 2009/0163403 | A1 | 6/2009 | Levorse, Jr. et al. |
| 2009/0163404 | A1 | 6/2009 | Levorse, Jr. et al. |
| 2009/0252789 | A1 | 10/2009 | Trophardy |
| 2009/0291176 | A1 | 11/2009 | Nagao et al. |
| 2010/0055267 | A1 | 3/2010 | Popplewell et al. |
| 2010/0196493 | A1 | 8/2010 | Buisson |
| 2011/0059205 | A1 | 3/2011 | Gaysinsky et al. |
| 2011/0064783 | A1 | 3/2011 | Bang-Madsen et al. |
| 2013/0022728 | A1 | 1/2013 | Popplewell et al. |
| 2014/0014276 | A1 | 1/2014 | Sorenson et al. |
| 2014/0193562 | A1 | 7/2014 | Popplewell et al. |
| 2014/0205713 | A1 | 7/2014 | Hans et al. |
| 2014/0284001 | A1 | 9/2014 | Amstad et al. |
| 2016/0051956 | A1 | 2/2016 | Penth et al. |
| 2016/0223255 | A1 | 8/2016 | Beetz et al. |
| 2016/0271513 | A1 | 9/2016 | Weitz et al. |
| 2017/0120267 | A1 | 5/2017 | Ackerman et al. |
| 2017/0312726 | A1 | 11/2017 | Sobel et al. |

FOREIGN PATENT DOCUMENTS

| | | | |
|---|---|---|---|
| CA | 1334460 | C | 3/1989 |
| CA | 1314432 | C | 3/1993 |
| CA | 2171389 | C | 3/1996 |
| CA | 2258751 | C | 12/1997 |
| CA | 2253154 | C | 5/1999 |
| CA | 2321660 | C | 9/1999 |
| CA | 2407614 | C | 11/2001 |
| CA | 2663386 | A1 | 4/2008 |
| EP | 0322137 | A1 | 6/1989 |
| EP | 0344375 | B1 | 12/1989 |
| EP | 0232313 | B1 | 5/1990 |
| EP | 0180366 | B1 | 6/1990 |
| EP | 0420509 | A1 | 4/1991 |
| EP | 0227486 | B1 | 11/1991 |
| EP | 0515478 | B1 | 12/1993 |
| EP | 0429482 | B1 | 4/1994 |
| EP | 0461197 | B1 | 6/1994 |
| EP | 0517423 | B1 | 3/1995 |
| EP | 0366898 | B1 | 2/1996 |
| EP | 0619075 | B1 | 1/1997 |
| EP | 0832695 | A2 | 4/1998 |
| EP | 1064856 | A2 | 1/2001 |
| EP | 1106081 | A1 | 6/2001 |
| EP | 1280591 | B1 | 12/2006 |
| EP | 1435797 | B1 | 8/2007 |
| EP | 2052622 | A1 | 4/2009 |
| EP | 2138567 | A1 | 12/2009 |
| EP | 3059537 | A1 | 8/2016 |
| GB | 575118 | A | 2/1946 |
| GB | 1015599 | A | 1/1966 |
| GB | 2364714 | A | 2/2002 |
| IE | 62024 | B1 | 12/1994 |
| WO | 9117821 | A1 | 11/1991 |
| WO | 9428181 | A2 | 12/1994 |
| WO | 9513864 | A1 | 5/1995 |
| WO | 9517174 | A1 | 6/1995 |
| WO | 9713416 | A1 | 4/1997 |
| WO | 9714288 | A2 | 4/1997 |
| WO | 9733485 | A1 | 9/1997 |
| WO | 9804243 | A1 | 2/1998 |
| WO | 0167897 | A1 | 9/2001 |
| WO | 0207541 | A1 | 1/2002 |

(56) References Cited

FOREIGN PATENT DOCUMENTS

| | | | |
|---|---|---|---|
| WO | 2005063032 | A1 | 7/2005 |
| WO | 2006082536 | A1 | 8/2006 |
| WO | 2007054853 | A1 | 5/2007 |
| WO | 2007096790 | A1 | 8/2007 |
| WO | 2007135583 | A2 | 11/2007 |
| WO | 2008047301 | A1 | 4/2008 |
| WO | 2008077399 | A1 | 7/2008 |
| WO | 2008113778 | A1 | 9/2008 |
| WO | 2010104713 | A1 | 9/2010 |
| WO | 2011121468 | A1 | 10/2011 |
| WO | 2012122010 | A2 | 9/2012 |
| WO | 2016064608 | A1 | 4/2016 |
| WO | 2016123224 | A1 | 8/2016 |

OTHER PUBLICATIONS

Baranauskiene, R., et al., "Flavor Retention of Peppermint (*Mentha piperita* L.) Essential Oil Spray-Dried in Modified Starches during Encapsulation and Storage", "Journal of Agricultural and Food Chemistry", Mar. 24, 2007, pp. 3027-3036, vol. 55.

Beetz, C., et al., "U.S. Appl. No. 16/005,302, Ultrahigh Efficiency Spay Drying Apparatus and Process, filed Jun. 11, 2018".

Broadhead, J., et al., "The Spray Drying of Pharmaceuticals", "Drug Development and Industrial Pharmacy", 1992, pp. 1169-1206, vol. 18, No. 11 and 12.

Coumans, W., et al., "Theoretical and Practical Aspects of Aroma Retention in Spray Drying and Freeze Drying", "Drying Technology", 1994, pp. 99-149, vol. 12, No. 1 and 2.

"Decision Granting Institution of Inter Partes Review filed on Dec. 15, 2015 for U.S. Pat. No. 8,939,388 (IPR2015-01418)".

Dobry, D., et al., "A Model-Based Methodology for Spray-Drying Process Development", "J. Pharm. Innov.", Jul. 25, 2009, pp. 133-142, vol. 4.

GEA Processing Engineering, Inc., "GEA Powder Technology Division: Niro: Spray Drying", "Accessed via http://www.niroinc.com/html/drying/fdpdfs/480gbspraydrying.pdf", Aug. 22, 2002, pp. 1-15.

Gohel, M., et al., "Spray Drying: A Review", "Pharmaceutical Reviews", Sep. 28, 2009, pp. 1-20, vol. 7, No. 5.

Gomez, A., et al., "Charge and fission of droplets in electrostatic sprays", "Phys. Fluids", Jan. 1994, pp. 404-414, vol. 6, No. 1.

Goula, A., et al., "Spray Drying of Tomato Pulp: Effect of Feed Concentration", "Drying Technology", 2004, pp. 2309-2330, vol. 22, No. 10.

"Merriam-Webster Dictionary Definition of 'Hygroscopic'", "http://www.merriam-webster.com/dictionary/hygroscopic (Accessed: Nov. 17, 2015)".

Killeen, M., "The Process of Spray Drying and Spray Congealing", "Pharmaceutical Engineering", Jul./Aug. 1993, pp. 56, 58-62, 64, vol. 13.

Langrish, T., et al., "Spray drying of food ingredients and applications of CFD in spray drying", "Chemical Engineering and Processing", 2001, pp. 345-354, vol. 40.

Leuenberger, H., "Spray freeze-drying—the process of choice for low water soluble drugs?", "Journal of Nanoparticle Research", 2002, pp. 111-119, vol. 4.

Moeller, J., et al., "A Primer on Spray Drying", "Chemical Engineering", Nov. 2009, pp. 34-40.

Mumenthaler, M., et al., "Atmospheric spray-freeze drying: a suitable alternative in freeze-drying technology", "International Journal of Pharmaceutics", 1991, pp. 97-110, vol. 72.

Rayleigh, L., "XX. On the Equilibrium of Liquid Conducting Masses Charged With Electricity", "Philosophical Magazine Series 5", 1882, pp. 184-186, vol. 14, No. 87.

Sirignano, W., "Fluid Dynamics and Transport of Droplets and Sprays, Second Edition", Jan. 2010, p. 34 Publisher: Cambridge University Press.

Westergaard, V., "The New Niro Integrated Filter Dryer IFD", "Danish Dairy and Food Industry . . . worldwide", Sep. 2002, pp. 62-64.

Zbicinski, I., et al., "Effect of Turbulence on Heat and Mass Transfer in the Atomization Zone", "Drying Technology", 1996, pp. 231-244, vol. 14, No. 2, Publisher: Taylor & Grancis Group.

Lacagnina, G., et al., "Experimental Study on the Forcing Design for an Intermittent Injection", "Experiments in Fluids", 2018, pp. 1-15, vol. 59, No. 123.

Jongsma, F., et al., "Large Eddy Simulation of Unsteady Turbulent Flow in a Semi-Industrial Size Spray Dryer", "Dairy Sci. and Technol.", 2013, pp. 373-386, vol. 93.

ULTRAHIGH EFFICIENCY SPRAY DRYING APPARATUS AND PROCESS

CROSS-REFERENCE TO RELATED APPLICATIONS

This is a continuation-in-part under 35 USC § 120 of U.S. patent application Ser. No. 16/005,302 filed Jun. 11, 2018 in the names of Charles Pershing Beetz and Jason Andrew Beetz for ULTRAHIGH EFFICIENCY SPRAY DRYING APPARATUS AND PROCESS, which in turn is a continuation-in-part under 35 USC § 120 of U.S. patent application Ser. No. 15/865,657 filed Jan. 9, 2018 in the names of Charles Pershing Beetz and Jason Andrew Beetz for ULTRAHIGH EFFICIENCY SPRAY DRYING APPARATUS AND PROCESS, which in turn is a continuation-in-part under 35 USC § 120 of U.S. patent application Ser. No. 15/668,832 filed Aug. 4, 2017 in the names of Charles Pershing Beetz and Jason Andrew Beetz for ULTRAHIGH EFFICIENCY SPRAY DRYING APPARATUS AND PROCESS, and issued Jan. 9, 2018 as U.S. Pat. No. 9,861,945. The disclosures of U.S. patent application Ser. No. 15/865,657 and U.S. patent application Ser. No. 15/668,832 are hereby incorporated herein by reference, in their respective entireties, for all purposes.

BACKGROUND

Field of the Disclosure

The disclosure relates to ultrahigh efficiency spray drying apparatus and process, utilizing induction of localized turbulence in a drying fluid flow stream to produce spray dried product, having particular utility for low temperature spray drying operations in which thermally sensitive materials are spray dried.

Description of the Related Art

Spray drying has existed as a basic materials processing operation since the late 1800s, and has been continually refined since that time. The spray drying operation may be of varied character, but typically involves injecting a liquid composition of material into a chamber for contact with a drying fluid concurrently flowed through the chamber. The injected wet material in the form of droplets contacts the stream of drying fluid so that the liquid passes from the droplets to the drying fluid stream, producing a spray dried product that is discharged from the drying chamber, and drying fluid effluent that likewise is discharged from the drying chamber.

In prior spray drying operations, it has been conventional practice to provide the drying fluid as a gas at high elevated temperature, e.g., temperatures on the order of 180-200° C., in order to produce dry powder products. The drying fluid has conventionally been air, and the material to be spray dried may be provided in a dryable liquid form, e.g., as a neat liquid material, or the material may be a solid in a spray drying liquid composition of slurry, suspension, emulsion, or solution form, which may additionally include carrier material with which the spray dried product is associated at the conclusion of the spray drying process. In various applications, the material to be spray dried is present in a slurry containing solvent, e.g., water, alcohol, or other appropriate liquid, as well as a carrier material, such as carbohydrate, cellulosic, wax, gum, protein, or other suitable material. To effect the spray drying operation, the spray drying composition is injected into the drying chamber using a nozzle, atomizer, or the like, to form a spray of fine droplets for contacting with the drying fluid that is flowed into and through the drying chamber.

The aforementioned high elevated temperature levels on the order of 180-200° C. for the drying fluid have been conventional practice in the art, in order to rapidly heat the droplets of spray dried material and volatilize the liquid therefrom for production of spray dried powder. Such high temperature levels, however, limit the applicability of the spray drying operation to spray dryable materials that are thermally stable or otherwise are not severely adversely affected at the high temperatures of the spray drying operation. A wide variety of materials can accommodate the high temperature regime of the spray drying operation, but suffer losses of material (through volatilization of the product material at high temperature) and/or otherwise are degraded in physical properties and/or performance characteristics as a result of their high temperature exposure during the spray drying operation. In such respect, the conventional spray drying practice has recognized limitations and deficiencies.

Against the foregoing context, the low temperature spray drying apparatus and process disclosed in ZoomEssence, Inc.'s U.S. Pat. Nos. 8,939,388, 9,332,776, and 9,551,527 embody a substantial advance in the art. As disclosed in such patents, spray drying is carried out at spray drying conditions including inlet temperature of the drying fluid below 100° C., and even down to ambient temperature in some applications, utilizing spray drying slurries having viscosity above about 300 mPa-sec, slurry water content not exceeding 50% by weight of the slurry, and low humidity of the drying fluid introduced to the drying system. Such spray drying operation, conducted at low temperature spray drying conditions markedly different from the conventional practice of the art, enables spray drying to be utilized for a myriad of products that would otherwise be contraindicated by the elevated temperature conditions of conventional high temperature spray drying practice.

Nonetheless, even though the low temperature processing disclosed in the aforementioned U.S. patents of ZoomEssence, Inc. vastly expands the population of spray dryable materials, large-volume spray drying chambers are required to provide sufficient contact time between the drying fluid and the sprayed droplets so that a dried powder product can be achieved. In this respect, the lower temperature regime that is employed in the ZoomEssence spray-drying process, relative to conventional high temperature spray drying, provides correspondingly reduced thermal driving force for volatilization of liquid from the droplets of the material being spray dried, and significant residence time of the sprayed droplets and corresponding extent of drying chamber volume therefore are needed to accommodate lower temperature of the drying fluid in the spray drying operation.

Large-volume spray drying chambers entail substantial capital equipment and operating costs, and require correspondingly sized atomizers, nozzles, pumps, compressors, piping, valving, and ancillary process equipment. This is true of spray drying systems generally, regardless of whether conventional high temperature spray drying, or the low temperature spray drying process of the aforementioned ZoomEssence patents, is practiced.

Accordingly, it would be a major advance in the art to provide a spray drying system and process in which spray drying can be carried out at ultrahigh hydrodynamic efficiency, enabling dramatically smaller spray drying vessels and dramatically shorter residence times to be utilized to produce spray dried powder product Such ultrahigh efficiency spray drying would thus enable a spray drying system of very compact, small footprint, character to be achieved, regardless of operating temperature regime, but when deployed in the low temperature operation described in the aforementioned ZoomEssence U.S. patents, would be remarkably effective in achieving high-rate production of dry powder spray dried products with substantially reduced capital equipment costs, energy requirements, and operating expenditures.

SUMMARY

The present disclosure relates to spray drying apparatus and process enabling spray drying operation to be conducted with ultrahigh efficiency, particularly when low temperature operation of the type described in ZoomEssence, Inc.'s U.S. Pat. Nos. 8,939,388, 9,332,776, and 9,551,527 is carried out. The disclosures of such U.S. Pat. Nos. 8,939,388, 9,332,776, and 9,551,527 are hereby incorporated herein by reference, in their respective entireties, for all purposes.

In one aspect, the present disclosure relates to a method of processing a spray dryable liquid composition to form a spray dried product, said method comprising:

generating a spray of the spray dryable liquid composition;

contacting the spray of spray dryable liquid composition in a spray drying contact zone with a stream of primary drying fluid;

injecting pressurized secondary drying fluid into the stream of primary drying fluid in the spray drying contact zone at multiple loci thereof to provide localized turbulence at said multiple loci; and recovering the spray dried product from the spray drying contact zone.

In another aspect, the disclosure relates to a spray drying system, comprising:

a spray drying vessel including an interior volume for contacting of introduced spray dryable liquid composition and a stream of primary drying fluid, said vessel including a spraying device positioned to introduce a spray of the spray dryable liquid composition into the interior volume for said contacting, an inlet for introduction of the primary drying fluid to the interior volume, and an outlet for discharging spray dried product and effluent drying fluid from the interior volume; and a multiplicity of secondary fluid injectors constructed and arranged to introduce pressurized secondary drying fluid into the interior volume at flow conditions providing localized turbulence in the stream of primary drying fluid in the interior volume at multiple loci in the stream of primary drying fluid.

In another aspect, the disclosure relates to a spray drying apparatus, comprising: a spray drying chamber having an interior volume and configured for introduction of spray dryable material into the interior volume for drying therein, and discharge of dried material and drying fluid therefrom; a primary drying fluid inlet arranged to introduce primary drying fluid into the interior volume of the chamber for contact with the spray dryable material in the interior volume, to provide a primary drying fluid flow stream through the interior volume; and a multiplicity of secondary drying fluid inlets configured to intermittently inject secondary drying fluid into the primary drying fluid flow stream to effect transient localized turbulence in the primary drying fluid flow stream, or alternatively for continuous injection of secondary drying fluid into the primary drying fluid flow stream, for enhancement of drying of the spray dryable material in the interior volume of the chamber.

Another aspect of the disclosure relates to a spray drying system comprising a spray drying apparatus of any of the types described above.

In a further aspect, the disclosure relates to a method of spray drying of a spray dryable material, comprising use of apparatus of any of the types described above.

In a further aspect, the disclosure relates to a method of spray drying of a spray dryable material in a primary drying fluid flow stream, comprising injecting secondary drying fluid into the primary drying fluid flow stream at multiple loci in the primary drying fluid flow stream, so as to create localized turbulence at such loci that enhances drying of the spray dryable material.

In a still further aspect, the disclosure relates to a method of spray drying of a spray dryable material in a primary drying fluid flow stream, comprising intermittently, transiently, and cyclically injecting secondary drying fluid into the primary drying fluid flow stream at multiple loci in the primary drying fluid flow stream, so as to create transient localized turbulence at such loci that enhances drying of the spray dryable material, or alternatively, continuously injecting secondary drying fluid into the primary drying fluid flow stream at multiple loci in the primary drying fluid flow stream, so as to create localized turbulence at such loci that enhances drying of the spray dryable material.

Another aspect of the present disclosure relates to a spray drying system, comprising:

(a) a spray drying vessel comprising:
  (i) an interior volume arranged to receive an atomized spray-dryable material and drying fluid for contacting of the atomized spray-dryable material with the drying fluid in the interior volume;
  (ii) at least one drying fluid inlet by which the drying fluid is introduced into the interior volume for said contacting; and
  (iii) a spray-dried material outlet communicating with the interior volume, arranged to discharge spray-dried material and effluent drying fluid from the vessel;

(b) an atomizer adapted to receive a spray-dryable material and discharge the atomized spray-dryable material into the interior volume of the vessel for said contacting;

(c) at least one turbulator adapted to generate turbulence in the drying fluid in the interior volume of the vessel;

(d) a process control unit adapted to regulate flow rate of drying fluid into the interior volume and flow rate of the spray-dryable material to the atomizer so that interaction of the drying fluid with the at least one turbulator produces turbulence in the drying fluid having a Kolmogorov length less than average particle size of spray-dryable material droplets in the atomized spray-dryable material in the interior volume of the vessel.

A further aspect of the present disclosure relates to a process for producing a spray-dried material, comprising:

generating an atomized spray-dryable material;

contacting the atomized spray-dryable material with drying fluid to form spray-dried material;

recovering the spray-dried material from the drying fluid; and during said contacting, inducing turbulence in the drying fluid having a Kolmogorov length less than average particle size of spray-dryable material droplets in the atomized spray-dryable material.

In another aspect, the disclosure relates to a spray drying system, comprising:

(a) a spray drying vessel comprising:
  (i) an interior volume arranged to receive an atomized spray-dryable material and drying fluid for contacting of the atomized spray-dryable material with the drying fluid in the interior volume;

(ii) at least one drying fluid inlet by which the drying fluid is introduced into the interior volume for said contacting; and (iii) a spray-dried material outlet communicating with the interior volume, arranged to discharge spray-dried material and effluent drying fluid from the vessel;

(b) an atomizer adapted to receive a spray-dryable material and discharge the atomized spray-dryable material into the interior volume of the vessel for said contacting;

(c) at least one turbulator adapted to generate turbulence in the drying fluid in the interior volume of the vessel;

(d) a process control unit adapted to regulate flow rate of drying fluid into the interior volume and flow rate of the spray-dryable material to the atomizer so that interaction of the drying fluid with the at least one turbulator produces turbulence in the drying fluid producing a turbulence dissipation rate exceeding 25 $m^2/sec^3$.

A further aspect of the disclosure relates to a process for producing a spray-dried material, comprising:

generating an atomized spray-dryable material;

contacting the atomized spray-dryable material with drying fluid to form spray-dried material;

recovering the spray-dried material from the drying fluid; and during said contacting, inducing turbulence in the drying fluid producing a turbulence dissipation rate exceeding 25 $m^2/sec^3$.

Other aspects, features and embodiments of the disclosure will be more fully apparent from the ensuing description and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
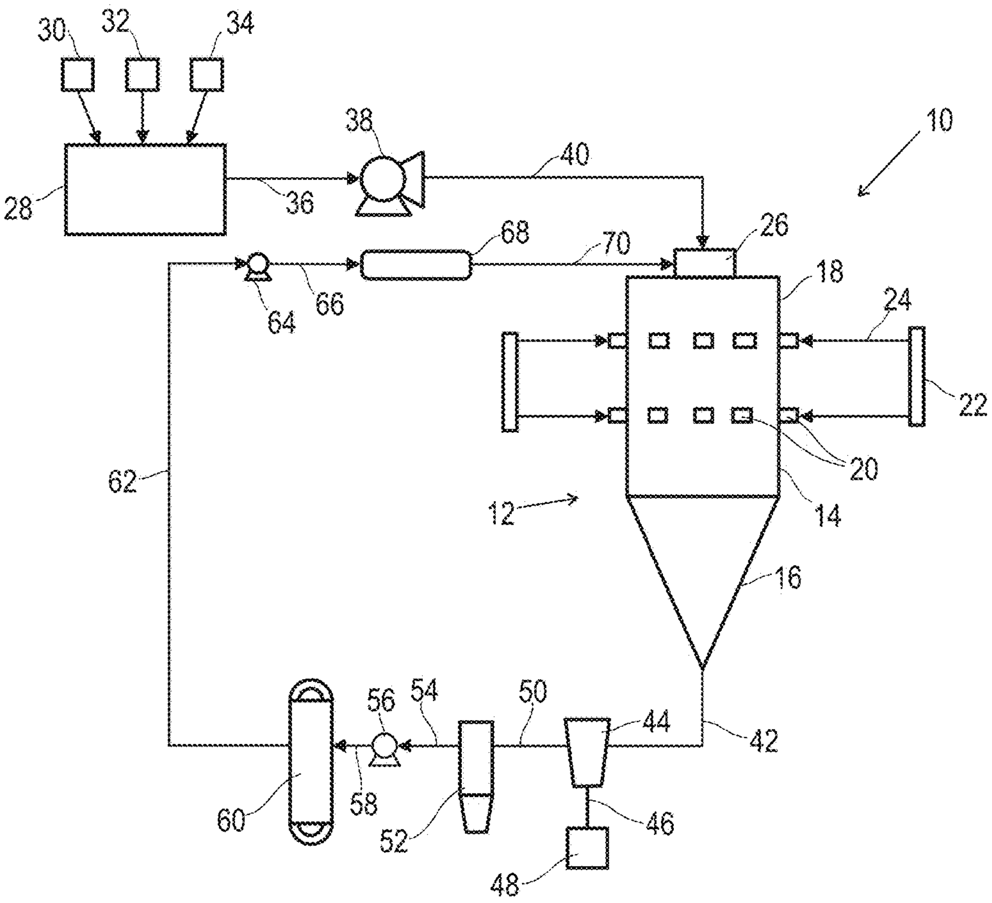
FIG. 1 is a schematic representation of a spray drying process system according to one embodiment of the present disclosure.

The present disclosure relates to a spray drying apparatus and process in which localized turbulence is induced in the drying fluid flow stream to enhance the production of spray dried product in an ultrahighly efficient manner, particularly when low temperature spray drying is carried out.

In conventional high-temperature spray drying installations, in which drying fluid is supplied to the spray drying vessel at temperatures on the order of 180° C.-200° C., the present inventors have determined that independently of energy efficiency as commonly measured in the spray drying industry, the actual utilization of the drying capacity of the drying fluid (dry air) that is supplied to the spray drying vessel in commercial operations is only about 10% to 50%. Such inefficiency of the drying capacity of the drying fluid manifests itself in increased residual moisture concentrations in the spray dried powder product or as deposition of sticky powder on the walls of the spray dryer vessel. Such inefficiency is generally accommodated by operating at the highest possible drying temperatures and/or utilizing secondary post-spray drying processes such as in-line fluidized bed drying. These secondary drying processes add to the complexity, cost and decreased energy efficiency of the overall spray drying process system.

As indicated in the discussion in the Background section hereof, the high elevated temperature levels on the order of 180° C.-200° C. that are utilized in conventional spray drying practice are recognized as significantly limiting the types of materials that may be processed by spray drying and as entailing significant detriment to the spray dried product, with respect to volatilization losses of product material, promotion of unwanted degradative and decomposition chemical reactions, and reduction of shelf life and stability characteristics, as well as increased capital, energy, and operating costs associated with the high temperature operation.

As also discussed in the background section hereof, the low temperature spray drying apparatus and process disclosed in ZoomEssence, Inc.'s U.S. Pat. Nos. 8,939,388, 9,332,776, and 9,551,527 embody a substantial advance in the art, permitting spray drying to be carried out at spray drying conditions including inlet temperature of the drying fluid below 100° C., and even down to ambient temperature in some applications, utilizing spray drying slurries having viscosity above about 300 mPa-sec, slurry solvent (e.g., water) content not exceeding 50% by weight of the slurry, and low humidity of the drying fluid introduced to the drying system.

The invention of the present disclosure represents a further advance in the art that is applicable to both conventional spray drying operations conducted at high elevated temperature levels, as well as to (electrostatic spray drying as well as non-electrostatic spray drying) low temperature spray drying operations conducted in accordance with the disclosures of the aforementioned ZoomEssence patents, in enabling such systems to achieve ultrahigh efficiency in the spray drying operations by induction of localized turbulences in the flow stream of drying fluid that is passed through the spray drying vessel. Such induction of localized turbulences enables extraordinarily high levels of mass transfer of solvent from the spray dried droplets to the drying fluid in the spray drying operation, enabling minimal spray drying vessel volumes to be utilized for achievement of spray dried powder products, thereby achieving capital equipment, energy, and operating expense reductions of a surprising and unexpected character. Such advantages are particularly substantial in low temperature spray drying operations, and enable remarkably compact and efficient spray drying process systems to be efficiently utilized in high rate commercial spray drying operations.

While the disclosure herein is primarily directed to the use of air as a drying fluid in the spray drying apparatus and method of the disclosure, it will be recognized that other drying fluids may be employed, as specific to the apparatus and methodology involved. For example, the drying fluid may comprise oxygen, oxygen-enriched air, nitrogen, helium, argon, neon, carbon dioxide, carbon monoxide, or other fluid species, including single component fluids, as well as fluid mixtures. The drying fluid may in various applications exist in a gaseous or vapor form, and the fluid should be constituted to provide an appropriate mass transfer driving force for passage of solvent or other desirably volatilizable material from the spray of spray dried material to the drying fluid.

The spray drying apparatus and process of the present disclosure may be utilized for spray drying of any suitable material that is spray dryable to constitute a desired product. The spray dried material may for example comprise a food material, beverage material, fragrance material, pigment material, flavor material, pharmaceutical material, therapeutic material, medication material, homeopathic material, biological material, probiotic material, construction material, formulating material, as well as any other materials that are spray dryable, and including mixtures, blends, composites, and combinations of two or more different materials of such types.

The spray dryable material may be of an initially liquid form that is spray dried to effect drying thereof to form a dry product. Alternatively, the spray dryable material may be of a solid or semi solid form, which is combined with other ingredients to form a spray dryable composition, e.g., ingredients selected from among solvents, carriers, adjuvants, excipients, surfactants, anti-agglomerants, anti-caking agents, co-active ingredients, wetting agents, dispersants, emulsifiers, stabilizers, antioxidants, preservatives, encapsulants, pore-forming agents, hardeners, including mixtures, blends, composites, and combinations of two or more ingredients of such types.

Solvents used in the spray dryable compositions of the present disclosure may be of any suitable type and may for example include water, inorganic solvents, organic solvents, and mixtures, blends, emulsions, suspensions, and solutions thereof. In various embodiments, organic solvents may be employed, such as for example acetone, chloroform, methanol, methylene chloride, ethanol, dimethyl formamide (DMF), dimethyl sulfoxide (DMS), glycerine, ethyl acetate, n-butyl acetate, and mixtures with water of the one or more of the foregoing. Such organic solvents may for example be used in spray drying of spray dryable compositions including protein-based materials. In specific embodiments, solvent selected from the group consisting of water, alcohols, and water-alcohol solutions may be advantageously employed.

In various applications, the spray dryable material will be solid material that is formulated with solvent and carrier material to form a spray dryable emulsion or slurry composition, in which the solvent is removed from the family divided droplets of spray dried material in the spray drying operation and the product material then is associated with the carrier material in the dry powder product. The carrier material may be of any suitable type, and may for example be selected from among carbohydrates, proteins, lipids, waxes, cellulosic material, sugars, starches, natural and synthetic polymeric materials, and any other materials having utility in association with the product material in the spray dried powder product. The carrier in some applications may be an encapsulant material, so that the spray dried powder product includes the product material encapsulated within the carrier material. Alternatively, the carrier may simply be associated with the product material in the spray dried powder product, e.g., as a substrate, support, or associative matrix for the product material. Among preferred carriers used in spray dryable liquid compositions in the spray drying systems and processes of the present disclosure, are starch carriers, sugar carriers, and cellulosic carriers.

Thus, the spray dryable compositions utilized in the systems and processes of the present disclosure may be of any suitable type, and may in specific embodiments comprise slurries or emulsions, or otherwise be constituted as solid dispersions.

In various low temperature (temperature of drying fluid fed to the spray drying vessel <100° C.) applications, when the spray dryable liquid composition comprises a slurry or emulsion of carrier, product material, and solvent, the viscosity of the slurry material may be controlled by appropriate formulations so that at the time of spray drying of the liquid composition, the viscosity is advantageously in a range of from 300 mPa-s (1 mPa-s=1 centipoise) to 28,000 mPa-s or more. In various other applications, the viscosity may be in a range in which a lower limit of the range is any one of 325, 340, 350, 375, 400, 450, 500, 550, 600, 650, 700, 750, 800, 850, 900, 950, and 1000 mPa-s, and in which an upper limit of the range is greater than the lower limit and is any one of 400, 450, 500, 550, 600, 650, 700, 750, 800, 850, 900, 950, 1000, 2000, 3000, 4000, 5000, 6000, 7000, 8000, 9000, 10,000, 11,000, 12,000, 13,000, 14,000, 15,000, 16,000, 17,000, 18,000, 19,000, and 20,000, with any viscosity ranges comprising any one of such lower limits and any one of such upper limits being usefully employed in various specific applications. A preferred viscosity range in some applications is from 500 to 16,000 mPa-s, and a preferred viscosity range in other applications is from 1000 to 4000 mPa-s.

In various low temperature applications involving spray dryable liquid compositions in the form of slurries or emulsions of carrier, product material, and solvent, the ratio of solvent within the slurry or emulsion is desirably controlled so that the ratio of solvent within the slurry at the spray drying operation does not exceed 50% by weight, based on total weight of the slurry (emulsion). For example, in various applications, the ratio of solvent in the slurry at the spray drying step may be from 20 to 50 weight percent, or from 20 to 45 weight percent, or from 20 to 40 weight percent, or from 25 to 35 weight percent, on the same total weight basis, as appropriate to the specific spray drying operation and materials involved.

The temperature of the drying fluid introduced to the spray drying vessel in the low temperature spray drying operations of the present disclosure may be any suitable temperature below 100° C., as measured at the inlet of the spray drying vessel (typically referred to in the art as the inlet temperature of the drying fluid). In various applications, the inlet temperature of the drying fluid may be controlled to be below 95° C., 90° C., 85° C., 80° C., 75° C., 70° C., 65° C., 60° C., 55° C., 50° C., 45° C., 40° C., 35° C., 30° C., 25° C., or 20° C., as appropriate to the specific spray drying operation involved.

In other applications, in which the apparatus and method of the present disclosure are utilized in conventional high-temperature spray drying (temperature of drying fluid fed to the spray drying vessel on the order of 180-200° C. or more), the spray dryable liquid composition containing carrier, product material, and solvent may have viscosity between about 10 and 200 mPa-s, and may contain an amount of water of from 50 to 70% by weight, based on total weight of the slurry (emulsion).

It will be appreciated that the viscosity and solvent concentration may be widely varied in specific applications, depending on the temperature regime and other spray drying operation conditions and materials. In general, the low temperature (electrostatic or alternatively non-electrostatic) spray drying methodology of the aforementioned ZoomEssence patents is preferred in the practice of the present disclosure, since such low temperature spray drying methodology utilizes less solvent (water) in the slurry or emulsion that is spray dried, which in turn greatly enhances drying at low temperatures since substantially less solvent is required to be evaporated in the spray drying operation. In marked contrast to high temperature drying, the "constant" rate period in low temperature spray drying is very short or nonexistent due to the initial low solvent concentration of the slurry or emulsion, so that drying is controlled almost from the outset by diffusion from the inner particle core through a porous drying layer to produce fully dense dry powder product without hollow regions or shell structures. The low temperature process in the localized turbulence generation method and apparatus of the present disclosure achieves a high concentration gradient between the sprayed particle (droplet) surface and the surrounding drying fluid.

The spray dried powder material that is produced by the spray drying apparatus and method of the present disclosure may be in any suitable morphological and physical forms, including spherical, spheroidal, polygonal, cuboidal, rod, fiber, helical, dendritic, and any other spatial forms, and may be of any suitable particle size distribution appropriate to the spray dried powder product.

The drying fluid in the spray drying process of the present disclosure in many applications may be or comprise air, and the solvent in the spray dryable liquid composition may be water or other aqueous medium, e.g., a water-alcohol solution. It is generally desirable that the drying fluid in the spray drying process be as dry as possible, in order to maximize the mass transfer gradient for transfer of solvent from the spray dried droplets to the drying fluid. In practice, this may involve treatment of the drying fluid to effect condensation of any moisture or other condensable material in the drying fluid, so that it is removed from the fluid stream that is flowed to the spray drying vessel for drying of the spray liquid composition in the interior volume of such vessel. In other applications, the treatment of the drying fluid may involve contacting of such fluid with physical adsorbent and/or chemical adsorbent materials, to remove components of the fluid that may be adverse to the drying process. In applications in which the drying fluid is or comprises air, and the spray dryable liquid composition is an aqueous composition, it is advantageous to control the relative humidity of the drying fluid, so that it is below 20% relative humidity, preferably below at least one of 18%, 15%, 12%, 10%, 8%, 5%, 2.5%, 2%, 1.5%, 1% and 0.5% relative humidity.

Spray drying of the spray dryable liquid composition may be carried out in any suitable manner that effects a spray of the liquid composition in the form of droplets or finely divided liquid particles, to provide appropriate surface to volume characteristics for the spray drying operation. The generation of the spray of spray dryable liquid composition may be affected with any suitable apparatus, including atomizers, nebulizers, ultrasonic dispersers, centrifugal devices, nozzles, or other appropriate devices. The liquid composition may be introduced into the interior volume of the spray drying vessel in a liquid film or ligament form that is broken up to form droplets. A wide variety of equipment and techniques is able to be utilized to form the spray of liquid composition in the form of droplets or finely divided liquid particles. Typically, droplet size and distribution may be fairly constant for a given spray drying technique, and may be in a range of 10-300 μm, or other suitable range.

Spray drying in accordance with the present disclosure may be or comprise electrostatic spray drying, in which an electrostatic charge is applied to the spray dryable feedstock liquid composition and/or to the wet particles produced by spraying of the feedstock liquid (e.g., slurry) composition so that a spray of electrostatically charged, wet particles (droplets) is produced, for enhanced drying of the particles as a result of the electrostatic effects. Thus, electrostatic charging of the spray-dryable material may be carried out before, during, or after atomization of the feedstock material. Electrostatic spraying equipment of widely varying types may be utilized in electrostatic spraying systems and operations in accordance with the present disclosure, e.g., an electrostatic spraying device positioned to introduce an electrostatically charged spray of the spray dryable liquid composition into the interior volume of a spray drying vessel for contacting with drying fluid therein, with induction of localized turbulence in the spray drying vessel, in accordance with the present disclosure.

Thus, when spray drying in accordance with the present disclosure comprises electrostatic spraying drying, the spray of the feedstock liquid composition is generated wherein the spray particles (droplets) advantageously have suitable electrostatic charge to enhance the spray drying operation, in relation to a corresponding spray drying operation in which electrostatic spray drying is not conducted. For example, an electrostatic spray atomizer may be employed to apply an electrostatic charge to the sprayed particles that is in a range of from 0.25 kV to 80 kV, although it will be recognized that higher or lower electrostatic charge may be imparted to the material to be spray dried in specific applications. In various embodiments, electrostatic charge imparted to the particles being spray dried may be in a range of from 0.5 to 75 kV, or from 5 to 60 kV, or from 10 to 50 kV, or in other suitable range or other specific value.

In other embodiments of electrostatic spray drying conducted in accordance with the present disclosure, the feedstock liquid composition may be sprayed through an electrostatic nozzle operatively coupled with a voltage source arranged to apply a cyclically switched voltage to the nozzle, e.g., between high and low voltages that are within any of the above-discussed, or other, voltage ranges.

In accordance with the present disclosure, localized turbulence is generated in the fluid stream of drying fluid flowed through the drying chamber of the spray drying vessel, intermittently or alternatively continuously, to provide perturbations in the overall drying fluid flow stream to enhance mass transfer efficiency of the drying operation, in the contact of the drying fluid with the sprayed liquid. The induction of localized turbulence in the drying fluid flow stream may be effected in any suitable manner, and may for example be generated by providing a multiplicity of jets or injectors that provide an intermittent or sustained burst of fluid into the drying fluid flow stream to induce localized turbulence in the flow stream, thereby disrupting any stagnant films of fluid on the sprayed liquid droplets or particles and effecting a local renewal of surface exposure of the liquid droplets or particles, in contact with the drying fluid flow stream.

For the induction of localized turbulence in the drying fluid flow stream, an array of jets or injectors may be arranged in and/or on the spray drying vessel, which inject secondary streams of fluid in a directional manner effecting the creation of localized turbulence. The array may be provided in a geometrically regular or irregular arrangement, and the jets or injectors may be oriented so that the direction of injection of secondary fluid into the main drying fluid flow stream is transverse to the bulk flow direction of the main drying fluid flow stream, or oblique in relation to such bulk flow direction, or otherwise oriented to generate the requisite localized turbulence activity in the drying fluid flow stream. The fluid utilized for such induction of localized turbulence may be of any suitable fluid type, and may for example be of a same fluid type as the main drying fluid flow stream, or alternatively may be of a different type that is compatible with the main drying fluid flow stream to effectuate enhancement of the drying operation. The injection of secondary streams of fluid may in various embodiments be carried out continuously, and in other embodiments, such injection of secondary streams of fluid may be carried out intermittently, e.g., cyclically and repetitively, as a burst or puff of the secondary fluid into the main drying fluid flow stream.

For such purpose, the array of jets or injectors may be linked with one another by suitable piping, valving, and manifolding, to provide the secondary fluid to the jets or injectors, e.g., from a common or unitary secondary fluid source. The respective ones of the jets or injectors may likewise be linked operationally by signal transmission lines to a control system so that the jets or injectors are actuated in any suitable coordinated fashion. For example, each of the jets or injectors may be actuated on a same cycle time sequence, for simultaneous transient injection of secondary fluid into the main drying fluid flow stream. Alternatively, the jets or injectors may be actuated so that only a portion thereof is actuated at a particular time, i.e., so that respective groups in the array are sequentially actuated, so that a first set of jets or injectors in a specific location is actuated for injection of secondary fluid into the main drying fluid flow stream, following which the first set of jets or injectors is shut off and a second set of jets or injectors at another specific location is actuated for injection of secondary fluid into the main drying fluid flow stream, in alternating fashion, or as part of a larger sequence of third, fourth, etc. sets of jets or injectors, in which each set is transiently actuated in turn, in the overall sequence.

Such array of jets or injectors may be of relatively simple character, involving only two, or several, jets or injectors that are concurrently or sequentially operated for secondary fluid introduction to the main drying fluid flow stream, or the array may include numerous jets or injectors, e.g., an array of from 5 to 100 jets or injectors, or even more, as appropriate to enhance the mass transfer of solvent from the sprayed liquid composition to the drying fluid flow stream in the spray drying vessel. It will therefore be appreciated that any number of jets or injectors can be utilized for localized induction of turbulence to enhance mass transfer in the spray drying operation, and that the operation of such jets or injectors can be continuous or intermittent, and may be partially or wholly synchronized with respect to portions or parts of the overall array, or may be carried out in any of various asynchronous manners, as appropriate to achieve enhancement of the spray drying operation. It will therefore be appreciated that a control system may be operatively linked to the individual jets or injectors in the array, wherein each of the jets or injectors is selectively actuated in an appropriate sequence and for a predetermined duration, by an associated control system.

The control system may therefore comprise a central processing unit, microprocessor, microcontroller, general or special purpose programmable computer, programmable logic controller, or the like, which carries out a cycle timer program. The cycle timer program may be constituted to transmit actuation signals to specific ones of the multiplicity of jets or injectors in the array according to a predetermined sequence of actuation for the jets or injectors in the array, so that the jets or injectors discharge pressurized secondary gas into the main drying fluid flow stream in such predetermined sequence. For such purpose, the central processing unit (CPU) or other controller may transmit actuation signals to the respective jets or injectors in the array according to the sequence to be carried out, wherein such actuation signals may for example open valves in the jets or injectors to provide for flow of pressurized gas through the jets or injectors and into the main drying fluid flow stream, with corresponding deactuation signals being sent to the respective jets or injectors in the array to close the valves in the jets or injectors to provide for termination of flow of pressurized gas therethrough into the main drying fluid flow stream. The valves may be deployed in the jets or injectors themselves or may be associated with such jets or injectors, e.g., in a manifold flow circuitry that is coupled with the jets or injectors in the array.

In general, the size, shape, number, and arrangement of the jets or injectors in the array may be widely varied to achieve optimum generation of localized turbulence that in turn maximizes the drying rate for the spray drying vessel, to produce dried powder product. In this respect, specific arrangements may be determined by hydrodynamic modeling of the main drying fluid flow stream and introductions of pressurized secondary fluid therein, to develop specific arrays of suitable size, shape, number, and arrangements of the jets or injectors. Alternatively and/or additionally, the size, shape, number, and placement of the jets or injectors may be determined by empirical methods, utilizing injection of pressurized secondary fluid containing tracer die therein, together with high-speed imaging of the fluid flow stream in the spray drying chamber, and empirical measurement of localized Reynolds numbers and other hydrodynamic variables, to experimentally determine an advantageous size, shape, number, and arrangements of jets or injectors in the array.

The spray drying vessel that is utilized in the practice of the present disclosure may be of any suitable size, shape, and arrangement, it being understood that the localized turbulence generation mediated by injection of secondary fluid by jets or injectors achieves a substantial improvement in drying efficiency of the spray drying vessel, relative to the drying efficiency that would be realized in the absence of such localized turbulence generation. Such improvement enables the spray drying vessel to be of a smaller volumetric character than would be required in the absence of such localized turbulence generation. Accordingly, the apparatus and method of the present disclosure facilitates the utilization of smaller, more compact spray drying vessels than are conventionally employed, so that the footprint of the spray dryer and overall process system can be made substantially smaller, with the increased drying efficiency providing benefits in respect of capital equipment, energy, and operating costs of the spray drying process system.

As an aid in understanding the improvement achieved by the apparatus and method of the present disclosure, it is instructive to consider the hydrodynamic character of a conventional spray drying vessel. A typical spray drying vessel geometry in conventional high-temperature spray drying operation involves a tall cylindrical tank that is supplied with a source of heated dry air. Once the air enters the spray dryer, the turbulent flow of the heated drying fluid quickly exchanges heat and mass with the atomized particles of the sprayed emulsion. The particles on leaving the atomizer are traveling at high speeds, which may be on the order of 50 to 150 meters/second. The particles are quickly slowed by air drag effects and become entrained in the dryer air flow. As the particles travel further from the atomizer and lose water (solvent) due to evaporation, the airflow is progressively less turbulent and the water concentration in the vicinity of the particle on average increases due to the limited diffusivity of water vapor in air. The particle drying rate is driven in part by the difference in water concentration in the particle and that in the air immediately surrounding the particle. Initially the concentration gradient is very large, and as evaporation from the particle surface progresses, the gradient decreases, slowing the rate of evaporation and the drying process.

In the interior volume of a conventional spray drying vessel, there are typically large regions where the particle density is low due to the air (drying fluid) flow patterns, and in which the air has a much lower water vapor concentration than other regions in which the drying fluid flow contains high concentrations of entrained particles. The result of these heterogeneities is that lower particle density regions of significantly drier air do not become mixed with higher particle density regions until the particles and associated fluid leave the spray drying vessel, whereupon the respective regions finally become mixed. This effluent from the spray drying vessel then typically passes to a cyclone or other fluid/solid separator device, and because the contact time from the spray drying vessel outlet to the cyclone apparatus is short, on the order of a few seconds, the mixing effect is insignificant and the air leaves without being fully utilized. Thus, in the interior volume of the spray drying vessel, the particle distribution is non-homogeneous, and the overall efficiency of the spray drying operation is correspondingly reduced.

The present disclosure addresses these hydrodynamic inefficiencies of the conventional spray dryer systems, enhancing drying fluid utilization by introducing puffs or jets of turbulent, dry secondary drying fluid along the main drying fluid flow path of the spray drying chamber. Even though the drying fluid flow in conventional spray drying systems is typically turbulent at the point of introduction, with some extent of associated turbulent mixing being inherent, there are invariably flow stratification effects, wall effects, and hydrodynamic behavioral anomalies of the drying fluid in the spray drying chamber that produce inhomogeneities in the volumetric particle density in the spray drying vessel during spray drying operation, resulting in low-level utilization of the drying fluid.

The approach of the present disclosure, of utilizing turbulent air (drying fluid) puffs or jets to cause increased, widespread high intensity turbulent mixing throughout the spray drying vessel interior volume, avoids the adverse hydrodynamic effects and anomalies inherent in conventional spray drying operations, to enhance mixing of the particle-laden, higher solvent concentration drying fluid flow regions with particle-deficient, lower solvent concentration drying fluid flow regions, resulting in enhanced diffusivity of solvent and other liquid constituents of the spray dried liquid composition in the interior volume of the spray drying vessel.

In a spray drying process conducted in accordance with the present disclosure, wherein transient injection of pressurized secondary drying fluid is effected, the transient jet or puff of drying fluid introduces a mass of turbulent dry fluid that moves through and mixes with the flow of particle-laden fluid circulating in the spray drying chamber. The resulting turbulent region effected by such secondary fluid injection alters the diffusion of molecular species in fundamental ways, and the high velocity flow produced by the jet or injector introduces chaotic flow behavior in which the molecular diffusion rate is substantially increased. The turbulent diffusivity can be over an order of magnitude greater than the diffusivity under non-turbulent conditions. Accordingly, particles in the turbulent regions created by the jets or injectors will experience an increased drying rate due to the increased diffusivity of the localized turbulent regions. Such turbulence rapidly reduces the concentration of solvent in the regions surrounding the particles being dried, increasing concentration gradients and enabling substantially increased drying rates to be achieved. A further advantage of the turbulent puffers is accelerated cooling of the particles when the secondary fluid being injected is at low temperature, e.g., ambient or room temperature. Such temperature quenching effect is important when materials being dried have a low glass transition temperature.

Referring now to the drawings, FIG. 1 is a schematic representation of a spray drying process system 10 according to one embodiment of the present disclosure.

As shown, the spray drying process system 10 comprises a spray dryer 12 including a spray drying vessel 14 having an upper cylindrical portion 18 and a downwardly convergent conical shaped lower portion 16. The spray drying vessel 14 in this embodiment is equipped with an array of puffer jets 20 installed in two circumferentially extending, longitudinally spaced apart rows in which each puffer jet is circumferentially spaced from the adjacent puffer jets in the row. Each of the puffer jets in the respective rows is arranged to be supplied with secondary drying fluid by the secondary fluid feed lines 24 associated with the source structure 22, which may extend circumferentially around the spray drying vessel 14, so that each of the puffer jets is connected with a secondary fluid feed line 24 in the same manner as the puffer jets shown at opposite sides of the spray drying vessel 14 in the system as depicted in FIG. 1.

The secondary fluid source structure 22 is depicted schematically, but may be constituted by suitable piping, valving, and manifolding associated with a secondary fluid supply tank and pumps, compressors, or other motive food drivers producing a flow of pressurized secondary drying fluid introduced to the puffer jets 20 in the secondary fluid feed lines 24.

At the upper end of the spray drying vessel 14, an inlet 26 is provided, to which the spray dryable liquid composition to be spray dried in the spray drying vessel 14 is flowed in liquid composition feed line 40 under the action of liquid composition pump 38 receiving the liquid composition in liquid composition supply line 36 from the liquid composition supply vessel 28. The liquid composition to be spray dried may be formulated in the liquid composition supply vessel 28, to which ingredient of the liquid composition may be supplied for mixing therein, e.g., under the action of a mixer device internally disposed in the liquid composition supply vessel 28 (not shown in FIG. 1). Such mixer device may be or include a mechanical mixer, static mixer, ultrasonic mixer, or other device effecting blending and homogenization of the liquid composition to be subsequently spray dried.

For example, when the liquid composition of the spray dried is a slurry or emulsion of solvent, carrier, and product material, the solvent may be supplied to the liquid composition supply vessel 28 from a solvent supply vessel 30, carrier material may be provided to the liquid composition supply vessel 28 from a carrier material supply vessel 32, and product material may be provided to the liquid composition supply vessel 28 from a product material supply vessel 34, as shown.

The liquid composition to be spray dried thus is flowed from the liquid composition supply vessel 28 through liquid composition supply line 36 to pump 38, and then flows under action of such pump in liquid composition feed line 40 to the inlet 26 of the spray drying vessel 14 to a spray device such as an atomizer or nozzle disposed in the inlet region of the interior volume of the spray drying vessel. Concurrently, main drying fluid is flowed in main drying fluid feed line 70 to the inlet 26 of the spray drying vessel 14, for flow through the interior volume of the spray drying vessel from the upper cylindrical portion 18 thereof to the lower conical portion 16 thereof, at the lower end of which the dried powder product and effluent drying fluid flow into the effluent line 42. During flow of the main drying fluid through the interior volume of the spray drying vessel 14, the puffer jets 20 are selectively actuated to introduce secondary drying fluid at suitable pressure and flow rate to induce localized turbulence in the interior volume, in the drying fluid flow stream, for enhancement of mass transfer and drying efficiency of the spray drying vessel.

The dried powder product and effluent drying fluid flowing in the effluent line 42 pass to the cyclone separator 44, in which the dried powder solids are separated from the effluent drying fluid, with the separated solids passing in product feed line 46 to the dried powder product collection vessel 48. The dried powder product in the collection vessel 48 may be packaged in such vessel, or may be transported to a packaging facility (not shown in FIG. 1) in which the collected dried powder product is packaged in bags, bins, or other containers for shipment and ultimate use.

The effluent drying fluid separated from the dried powder product in the cyclone separator 44 flows in effluent fluid feed line 50 to the baghouse 52 in which any residual entrained fines in the effluent fluid are removed, to produce a fines-depleted effluent fluid that then is flowed in effluent fluid transfer line 54 to blower 56, from which the effluent fluid is flowed in blower discharge line 58 to the condenser 60 in which the effluent fluid is thermally conditioned as necessary, with the thermally conditioned effluent fluid than being flowed in recycle line 62 to blower 64, from which the recycled effluent fluid flows in pump discharge line 66 to dehumidifier 68 in which residual solvent vapor is removed to adjust the relative humidity and dewpoint characteristics of the drying fluid to appropriate levels for the spray drying operation, with the dehumidified drying fluid then flowing in main drying fluid feed line 70 to the inlet 26 of the spray drying vessel 14, as previously described. The dehumidifier may in various embodiments be constructed and arranged to provide both the primary drying fluid and the secondary drying fluid to the spray drying vessel 14 at a predetermined relative humidity and dewpoint characteristic, or multiple dehumidifiers may be provided in the spray drying system for such purpose.

Figure 2:
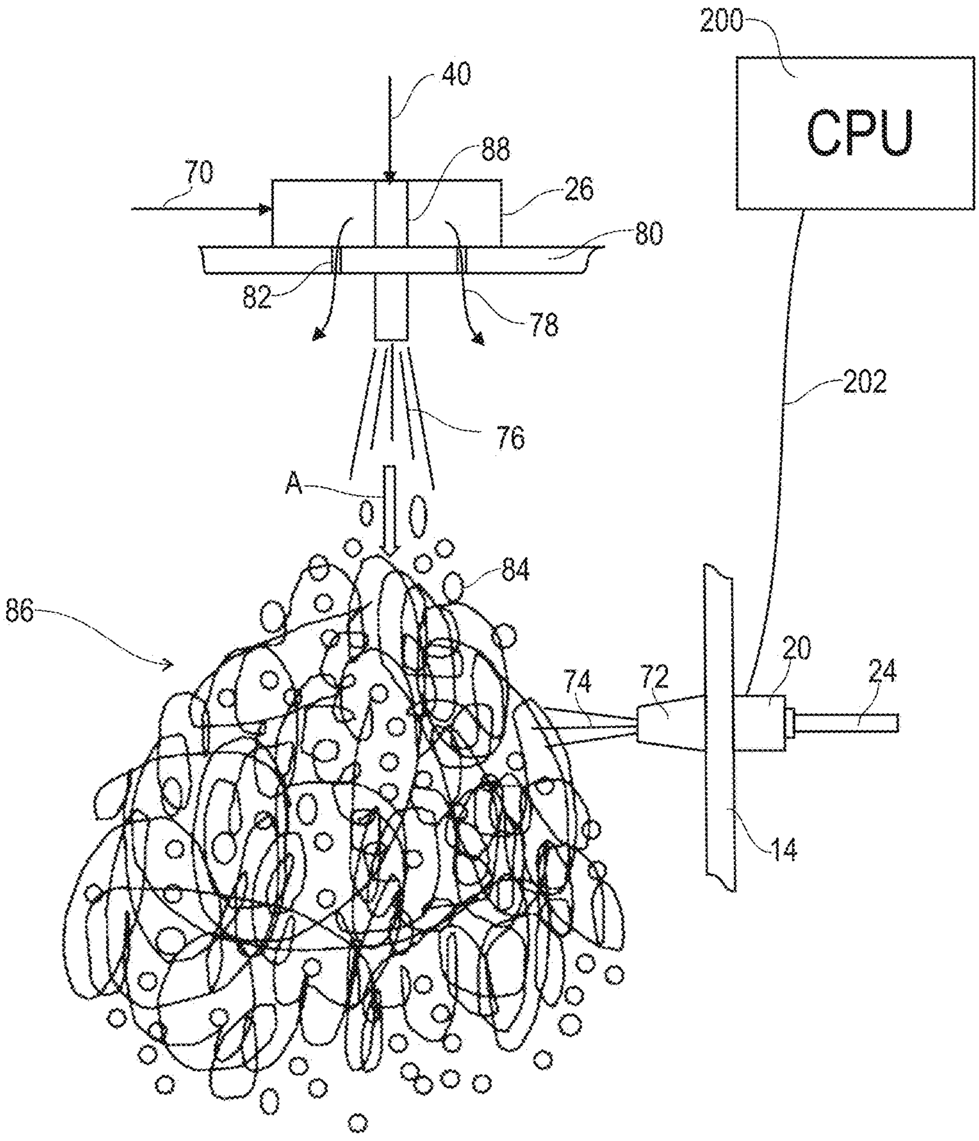
FIG. 2 is a schematic representation, in breakaway view, of a portion of the spray drying process system of FIG. 1, showing the action of localized turbulence induction in the spray drying vessel of the system.

FIG. 2 is a schematic representation, in breakaway view, of a portion of the spray drying process system of FIG. 1, showing the action of localized turbulence induction in the spray drying vessel of the system.

As depicted, the inlet 26 of the spray dryer 14 includes a top wall 80 on which the inlet 26 is reposed, receiving main drying fluid in main drying fluid feed line 70, and spray dryable liquid composition in liquid composition feed line 40. In the inlet, the introduced spray dryable liquid composition flows into the atomizer nozzle 88 extending through the top wall 80, and is discharged at the open lower end of such nozzle as an atomized spray 76 of liquid droplets 84 that fall through the interior volume of the spray drying vessel 14, in the direction indicated by arrow A, while being contacted with the main drying fluid introduced from main drying fluid feed line 70 to the inlet 26, for flow through openings 82 in the top wall 80, with the main drying fluid then flowing downwardly as indicated by arrows 78, so that the co-currently introduced main drying fluid and atomized liquid droplets 84 are contacted with one another.

During such contacting of the main drying fluid and droplets of the atomized spray dryable liquid composition, the puffer jet 20 is actuated by an actuation signal transmitted in signal transmission line 202 from CPU 200, to initiate injection of secondary drying fluid supplied in the in the secondary fluid feed line 24 from the distal nozzle 72 of the puffer jet, to introduce a turbulent injected flow 74 of secondary drying fluid that in interaction with the main drying fluid flow stream creates a localized turbulence region 86 in the interior volume of the spray drying vessel 14, to enhance mass transfer and drying efficiency.

The CPU 200 thus may be programmable he arranged and constructed to actuate the puffer jet 20 intermittently, cyclically and repetitively, to provide a series of bursts of turbulent secondary drying fluid into the main drying fluid flow stream that disruptively and intensively mixes the drying fluid with the droplets of atomized liquid composition, and wherein others of the multiple puffer jets associated with the spray drying vessel 14 may be synchronously or asynchronously actuated in relation to puffer jet 20, in any suitable pattern and timing schedule of "firings" of individual puffer jets in the overall system.

Figure 3:
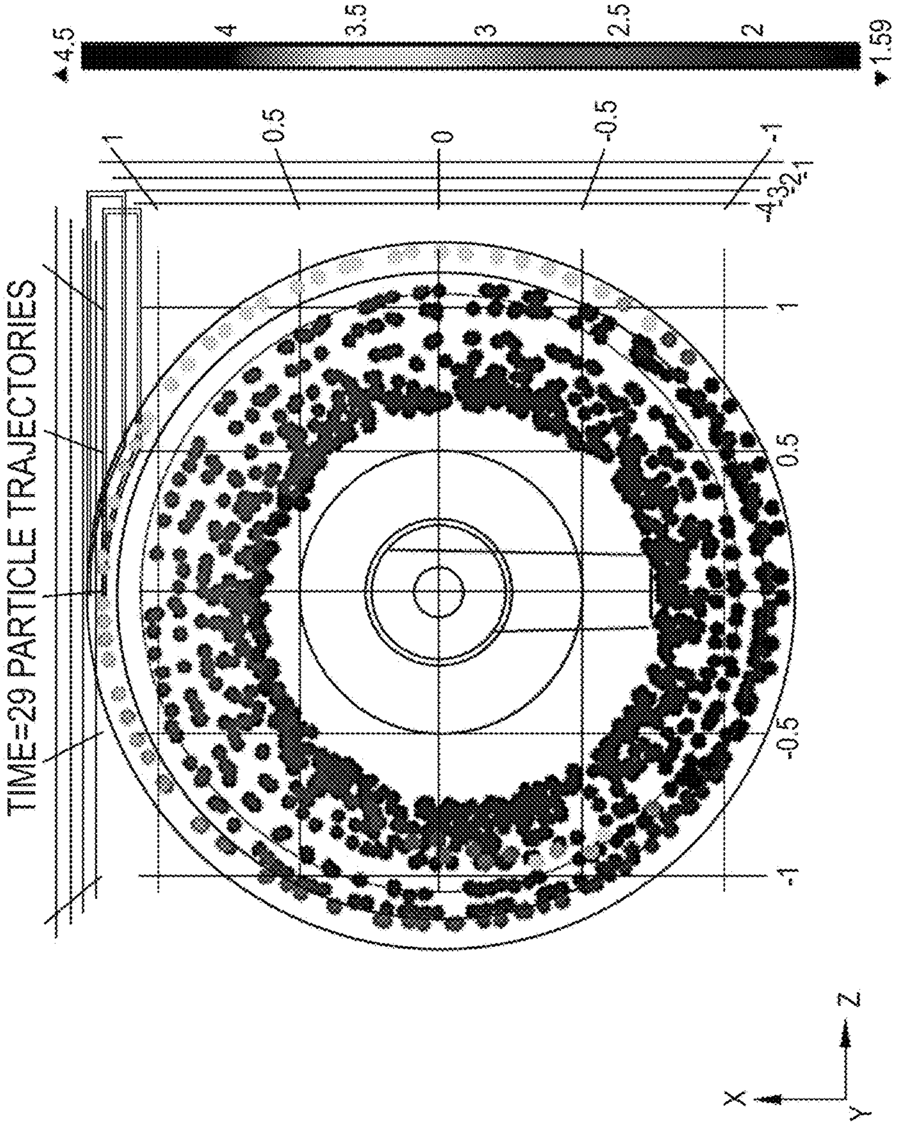
FIG. 3 is a graphical depiction of particle trajectories in a tangential inlet rotary atomizer spray dryer, as calculated using computational fluid dynamics, illustrating the movement of the particles to the outer wall of the dryer, leaving a substantial volume that is devoid of particles.

FIG. 3 is a graphical depiction of particle trajectories in a tangential inlet rotary atomizer spray dryer, as calculated using computational fluid dynamics, illustrating the movement of the particles to the outer wall of the dryer, leaving a substantial volume that is devoid of particles, in the absence of puffer jet instigation of localized turbulence in accordance with the present disclosure.

The spray dryer vessel utilized in this depiction has a cylindrical geometry with a tangential air inlet, in which particles of the spray dryable liquid composition are atomized by a rotating atomizer located in the center top portion of the spray dryer vessel. Particles released from the atomizer initially travel radially outward until slowed by air drag, becoming entrained in the flow field of the spray dryer vessel. The particles are pushed by this flow through the interior volume of the spray dryer vessel and out the bottom discharge port of the spray dryer vessel.

In this type of geometry, the center region of the interior volume of the spray dryer vessel has a low density of particles due to the action of the air flow and the centripetal acceleration on the particles. The air (drying fluid) in this region also has a much lower water vapor concentration than the flow with the entrained particles. Most of this central region of significantly drier air does not become mixed with the outer region of flow where the particles are entrained until leaving the spray dryer vessel, whereupon it finally becomes mixed with the particle laden air. Nonetheless, because the contact time from the outlet of the spray dryer vessel to the cyclone unit is short, on the order of a few seconds, the mixing effect is insignificant and the air leaves without being fully utilized. Similar effects can also be observed in vertical airflow spray dryer vessel geometries, in which the particle distribution throughout the dryer volume is also very non-homogeneous.

By utilizing an array of puffer jets in accordance with the present disclosure, the above-described inhomogeneity in the interior volume of the spray dryer vessel can be minimized or even eliminated, to achieve order of magnitude increases in diffusivity in regions that in the absence of localized turbulence generation would be grossly underutilized in terms of the drying capacity of the drying fluid in such regions.

Figure 4:
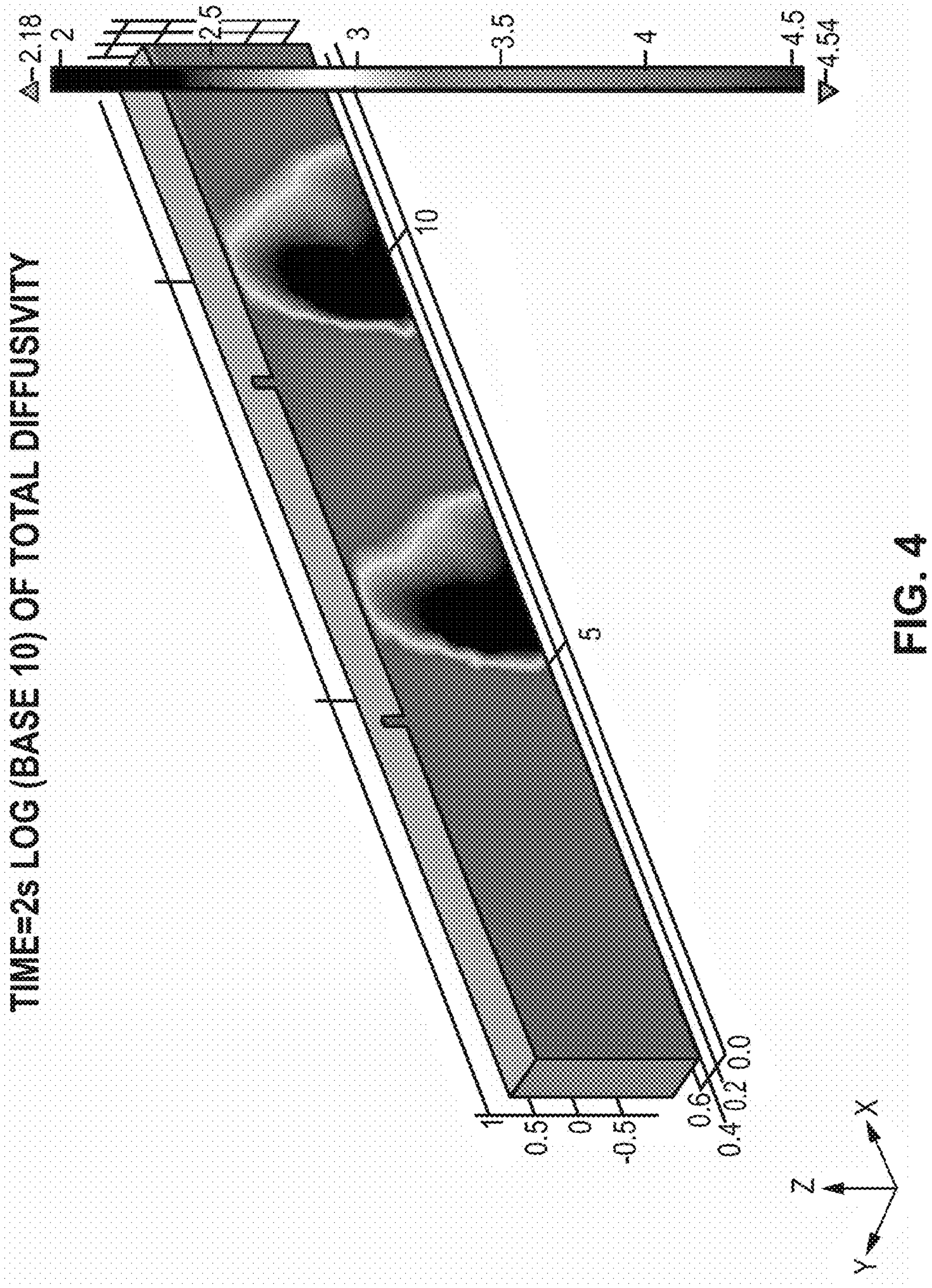
FIG. 4 is a graphical depiction of a computational fluid dynamics simulation of effect on total diffusivity caused by turbulent puffs introduced into airflow in a rectangular duct, 1.5 seconds after the puff has occurred.

FIG. 4 is a graphical depiction of a computational fluid dynamics simulation of effect on total diffusivity caused by turbulent puffs introduced into airflow in a rectangular duct, 1.5 seconds after the puff has occurred. The plot shows the evolution of the total diffusivity along a vertical center plane of the duct one and a half seconds after occurrence of the puffs. The puffs were introduced at time=1 second. Air enters from the left end of the duct and exits from the right end. Turbulent puffs are introduced by two nozzles located on the top of the duct along the longitudinal centerline. The puffs are directed perpendicular to the main flow. This diffusivity profile persists for up to 5 seconds, propagating along the duct.

FIG. 4 thus illustrates through the use of computational fluid dynamics the effect of turbulence on the diffusivity for two jets, each injecting a high velocity jet of air into a linear rectangular duct with air flowing through it at a linear velocity of 1 meter/second. The jets turn on at one second from the time the duct flow is established. The puffs have a duration of one second, introducing a high speed flow at right angles to the main flow traveling in the duct, producing a region of turbulence in the flow. In the turbulent region the diffusivity has increased by over 50% as shown in FIG. 4. At the initial introduction of the puff, the diffusivity increased by an order of magnitude. This effect will also increase the drying rate by nearly an order of magnitude in the affected regions, dramatically improving the utilization of the dry process air and improving the overall energy efficiency of the process. The turbulent effects persist for an extended period of time, on the order of many seconds, much longer than the duration of the pressure pulse that produced the puff. The spatial extent of the puff increases linearly with distance traveled as illustrated in FIG. 4. The puff volume also scales as the cube of the puff width, thus enabling the effects to increasingly effect the entire flow volume in the spray drying chamber.

Thus, by placing a series of air injection nozzles around the circumference of a spray dryer vessel and periodically pulsing the nozzles on, the powder particles in these turbulent regions will experience higher concentration gradients and higher drying rates. The extended spatial region of the turbulent mixing created by the puffs will enable more complete and continued mixing of the air and particles throughout the volume of the spray drying chamber. A further advantage of the turbulent puffers, as discussed, is accelerated cooling of the particles by injecting air at room temperature before leaving the dryer, of particular importance when the material being dried has a low class transition temperature. This method of introduction of purposeful turbulent mixing has not to our knowledge been previously used in spray drying processes and represents a novel utilization of turbulent effects for significantly increasing the efficiency of the spray drying process in a manner not previously appreciated in the spray drying industry.

Figure 5:
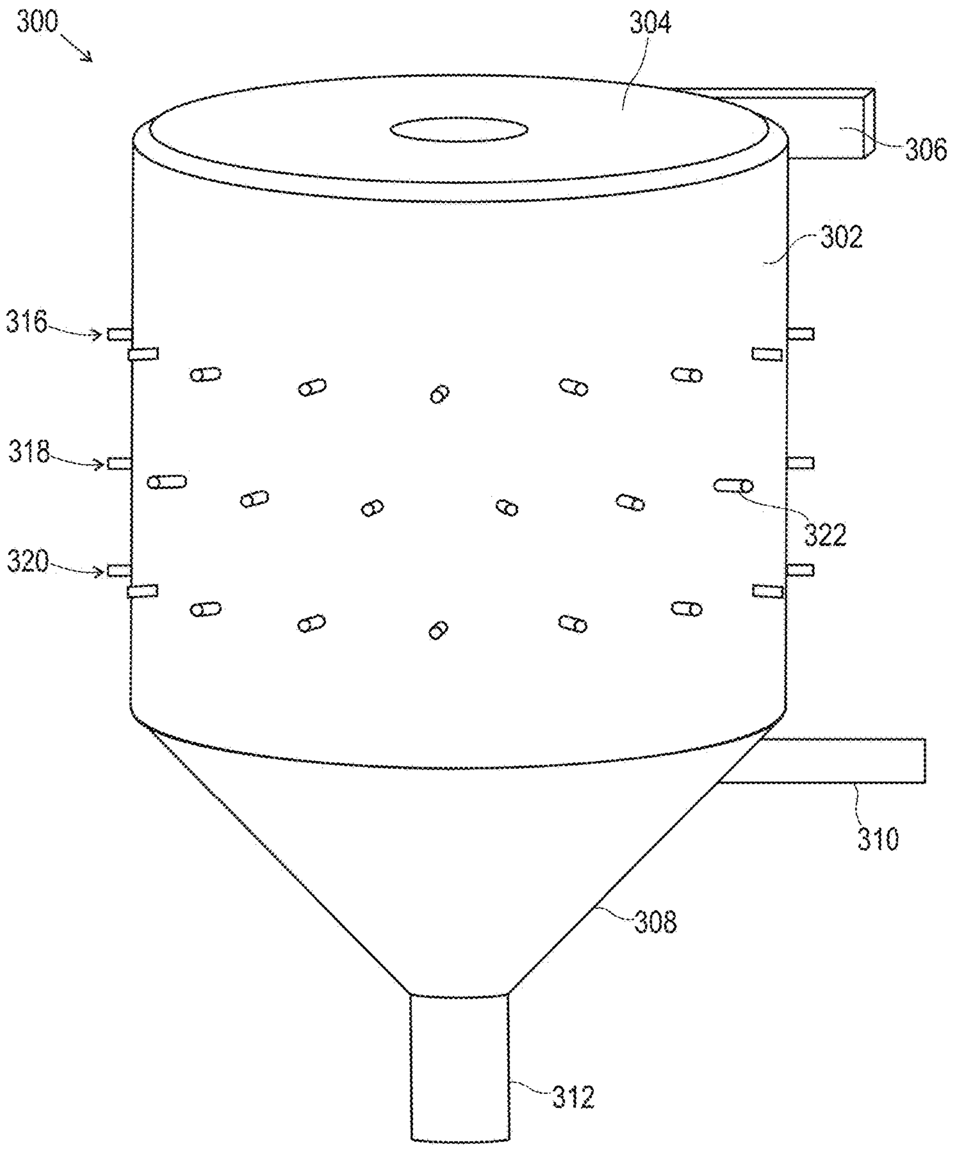
FIG. 5 is a schematic representation of a spray drying apparatus according to one embodiment of the present disclosure, featuring an array of turbulent mixing nozzles on the spray drying chamber wall, configured for injection of transient, intermittent turbulent air bursts into the main fluid flow in the spray drying chamber.

FIG. 5 is a schematic representation of a spray drying apparatus according to one embodiment of the present disclosure, featuring an array of turbulent mixing nozzles on the spray drying chamber wall, configured for injection of transient, intermittent turbulent air bursts into the main drying fluid flow stream in the spray drying chamber.

As illustrated in FIG. 5, the spray drying apparatus 300 includes a cylindrical wall 302 that at its upper extremity is secured to a circular top wall 304 having a central opening therein to accommodate a spray atomizer (not shown in FIG. 5) for spraying an atomized emulsion into the interior volume of the spray drying chamber bounded by such cylindrical and top walls. The spray drying apparatus further includes a frustoconical lower wall 308 that at its lower end is joined to a cylindrical conduit 312, which may be provided with an air seal or other closure element that is selectively openable to remove dried material from the apparatus.

The spray drying apparatus thereby encloses an interior volume to provide a spray drying chamber in which the sprayed emulsion atomized particles are contacted with drying air, introduced to the chamber through the air inlet passage 306 at the upper portion of the spray dryer. The spray dryer at an upper portion of the frustoconical wall 308 is provided with a takeoff conduit 310 through which the drying air/particles mixture may be discharged from the spray drying chamber and conveyed to a cyclone for fluid/solid separation.

The cylindrical wall 302 is provided with axially spaced-apart rows 316, 318, and 320 of turbulent air injection nozzles 322. In each of the rows, the nozzles are circumferentially spaced apart around the full circumference of the wall. In this arrangement, the nozzles are arranged in a circular pattern with intervening spacing such that the spatial envelope of each nozzle overlaps to some extent the spatial envelope of the next adjoining nozzle in the array. The nozzles in the second row 318 are offset by an appropriate angle, in relation to the nozzles in the and first and third rows, to improve the volumetric coverage of the injected turbulent fluid.

The nozzles are depicted as tubular elements in the schematic representation of FIG. 5, for ease of reference, but it will be appreciated that each of the nozzles is coupled in gas flow communication with a source of pressurized air. Such coupling may be effected by a manifold conduit circumscribing the cylindrical wall 302 which is connected to the outer (proximal) end of the nozzle, so that the nozzles constitute branches of the manifolded flow circuitry. The individual nozzles may be provided with flow control valves equipped with pneumatic or other type actuators, so that high-pressure air may be maintained in the manifold conduit, and injected, upon opening of the valve in the individual nozzle, into the interior volume of the spray drying chamber. In such arrangement, the actuators of the respective flow control valves may be coupled to a cycle timer apparatus, e.g., a central processor unit (CPU), microprocessor, programmable logic unit, or other device for cyclically and repetitively opening the valves in the respective nozzles to effect a burst of injected air from the nozzles at their proximal ends, with the control device serving to cause the valve actuators to close the valves at the end of the desired duration of the air injection operation. The nozzle may have a single orifice or comprise an array of orifices, with the orifice size selected to ensure adequate penetration of the bursts of injected air into the interior volume of the spray dryer.

In an illustrative embodiment, each of the nozzles may have a fluid dispensing "on" duration in a range of from 0.1 to 100 seconds. In other embodiments, the duration of such "on" time may be in a range of from 0.1 to 60 seconds. The excitation pressure applied to the nozzle in the "on" state may be any suitable value, and may for example be a pressure in a range of from 1 to 200 psi, with a volumetric flow rate of from 1 to 100 $ft.^3$ per minute, as appropriate for the spray dryer specific size and so as not to disrupt the spray dryer main airflow pattern. The duty cycle of the nozzles can range from 1% to 100%, depending on the dryer airflow. The nozzles can be individually excited or turned on in specially configured arrangements or all excited simultaneously as required for a specific dryer operation. For example, the spray dryer illustratively shown in FIG. 5 may be operated with all nozzles turned on simultaneously, and subsequently simultaneously turned off after an "on" duration of 1 second. The nozzles then remain "off" for a period of 5 seconds, following which the cycle is repeated. The delay between the "off" state and the following "on" state is determined primarily by the time it takes for damping of the localized induced turbulence to occur.

The specific timing and duration of the respective "on" and "off" portions of the cyclic air injection process during spray drying of emulsified material in the spray dryer may be determined empirically by those of ordinary skill in the art, based on the disclosure herein, e.g., by hydrodynamic modeling and/or deployment of nozzles in a selected pattern on the spray drying chamber and determination of the relevant characteristics of the spray dried material discharged from the chamber for different specific cycles of air injection.

Accordingly, the present disclosure represents a major advance in the art of spray drying of spray dryable liquid compositions to form spray dried product, in an ultrahigh efficiency manner.

The present disclosure may therefore be implemented, utilizing a method of processing a spray dryable liquid composition to form a spray dried product, such method comprising: generating a spray of the spray dryable liquid composition; contacting the spray of spray dryable liquid composition in a spray drying contact zone with a stream of primary drying fluid; injecting pressurized secondary drying fluid into the stream of primary drying fluid in the spray drying contact zone at multiple loci thereof to provide localized turbulence at said multiple loci; and recovering the spray dried product from the spray drying contact zone. This method may be further implemented with any one or more of the following features (A)-(S), to the extent that any such multiple features are compatible with one another:

(A) the primary drying fluid and secondary drying fluid are introduced to the spray drying contact zone at temperature below 100° C. and above freezing temperature of solvent in the spray dryable liquid composition;

(B) the injecting is continuously conducted during the contacting;

(C) the injecting is intermittently conducted during the contacting;

(D) the injecting is carried out according to a predetermined injecting schedule, in a cyclic repeating manner;

(E) the primary drying fluid and secondary drying fluid are each independently selected from the group consisting of air, oxygen, oxygen-enriched air, nitrogen, helium, argon, neon, carbon dioxide, carbon monoxide, and combinations of two or more of the foregoing;

(F) the primary drying fluid and secondary drying fluid are each air;

(G) the spray dryable liquid composition comprises at least one product material selected from the group consisting of food materials, beverage materials, fragrance materials, pigment materials, flavor materials, pharmaceutical materials, therapeutic materials, medication materials, homeopathic materials, biological materials, probiotic materials, construction materials, formulating materials, and mixtures, blends, composites, and combinations of two or more different materials of the foregoing;

(H) the spray dryable liquid composition comprises at least one ingredient selected from the group consisting of solvents, carriers, adjuvants, excipients, surfactants, anti-agglomerants, anti-caking agents, co-active ingredients, wetting agents, dispersants, emulsifiers, stabilizers, antioxidants, preservatives, encapsulants, pore-forming agents, hardeners, and mixtures, blends, composites, and combinations of two or more ingredients of the foregoing;

(I) the spray dryable liquid composition comprises an aqueous composition;

(J) the spray dryable liquid composition comprises solvent selected from the group consisting of water, alcohol, and aqueous alcohol solution;

(K) the spray dryable liquid composition comprises at least one carrier, e.g., selected from the group consisting of carbohydrates, proteins, lipids, waxes, cellulosic materials, sugars, starches, and natural and synthetic polymeric materials;

(L) the spray dryable liquid composition has a viscosity in a range of from 300 mPa-s to 28,000 mPa-s, e.g., from 500 mPa-s to 16,000 mPa-s, or more specifically from 1000 mPa-s to 4000 mPa-s;

(M) the spray dryable liquid composition comprises from 20 to 50% by weight of solvent, based on total weight of the spray dryable liquid composition;

(N) the solvent comprises water;

(O) the primary drying fluid and secondary drying fluid are introduced to the spray drying contact zone at temperature below at least one of 95° C., 90° C., 85° C., 80° C., 75° C., 70° C., 65° C., 60° C., 55° C., 50° C., 45° C., 40° C., 35° C., 30° C., 25° C., and 20° C., and wherein such temperature is above freezing temperature of solvent in the spray dryable liquid composition;

(P) the primary drying fluid and secondary drying fluid are introduced to the spray drying contact zone at below 20% relative humidity;

(Q) the primary drying fluid and secondary drying fluid are introduced to the spray drying contact zone at relative humidity below at least one of 18%, 15%, 12%, 10%, 8%, 5%, 2.5%, 2%, 1.5%, 1% and 0.5% relative humidity;

(R) the spray of spray dryable liquid composition comprises droplets of size in a range of from 10 to 300 μm; and (S) the injecting is controlled with a control system executing a predetermined cycle timer program.

In various embodiments, a spray drying system in accordance with the present disclosure may be utilized, as comprising: a spray drying vessel including an interior volume for contacting of introduced spray dryable liquid composition and a stream of primary drying fluid, said vessel including a spraying device positioned to introduce a spray of the spray dryable liquid composition into the interior volume for said contacting, an inlet for introduction of the primary drying fluid to the interior volume, and an outlet for discharging spray dried product and effluent drying fluid from the interior volume; and a multiplicity of secondary fluid injectors constructed and arranged to introduce pressurized secondary drying fluid into the interior volume at flow conditions providing localized turbulence in the stream of primary drying fluid in the interior volume at multiple loci in the stream of primary drying fluid. Such spray drying system may be deployed, in various arrangements, comprising any one or more of the following features (A)-(X), to the extent that any such multiple features are compatible with one another:

(A) the multiplicity of secondary fluid injectors are mounted on the spray drying vessel in an array;

(B) the spray drying vessel comprises a cylindrical portion on which the array of secondary fluid injectors is mounted;

(C) the array of secondary fluid injectors comprises at least one circumferentially extending row of secondary fluid injectors, each secondary fluid injectors in each such row being circumferentially spaced apart from adjacent secondary fluid injectors in such row, and wherein multiple rows when present are axially spaced apart with respect to a central axis of the spray drying vessel;

(D) each of the multiplicity of secondary fluid injectors is actuated for secondary fluid injection by a control system;

(E) the control system is constructed and arranged to execute a cycle timer program for actuation of the secondary fluid injectors;

(F) each of the multiplicity of secondary fluid injectors is actuatable to supply a transient burst of secondary fluid to the interior volume of the spray drying vessel;

(G) a selected one or ones of said multiplicity of secondary fluid injectors is actuatable by the control system to supply a transient burst of secondary fluid to the interior volume of the spray drying vessel, while selected others of said multiplicity of secondary fluid injectors are deactuated, in a predetermined sequence in which each of the multiplicity of secondary fluid injectors is intermittently actuated in the predetermined sequence;

(H) each of the multiplicity of secondary fluid injectors is actuatable to continuously supply secondary fluid to the interior volume of the spray drying vessel during spray drying operation therein;

(I) flow circuitry receiving spray dried product and effluent drying fluid from the outlet of the spray drying vessel, said flow circuitry containing a fluid/solids separator constructed and arranged to separate spray dried product from the effluent drying fluid, and a dehumidifier configured to dry the effluent drying fluid, from which spray dried product has been separated, to a predetermined extent, said flow circuitry being constructed and arranged to recycle the drying fluid, subsequent to its being dried by the dehumidifier, to the inlet of the spray drying vessel, as at least part of the primary drying fluid introduced to the interior volume of the spray drying vessel;

(J) a primary drying fluid source constructed and arranged to provide primary drying fluid to the spray drying vessel at temperature below 100° C. and above freezing temperature of solvent in the spray dryable liquid composition;

(K) a control system constructed and arranged for operation of the multiplicity of secondary fluid injectors;

(L) a source of primary drying fluid and a source of secondary drying fluid;

(M) each of the respective sources of primary drying fluid and secondary drying fluid independently contains a fluid selected from the group consisting of air, oxygen, oxygen-enriched air, nitrogen, helium, argon, neon, carbon dioxide, carbon monoxide, and combinations of two or more of the foregoing;

(N) a source of the spray dryable liquid composition;

(O) the source of the spray dryable liquid composition contains spray dryable liquid composition comprising at least one product material selected from the group consisting of food materials, beverage materials, fragrance materials, pigment materials, flavor materials, pharmaceutical materials, therapeutic materials, medication materials, homeopathic materials, biological materials, probiotic materials, construction materials, formulating materials, and mixtures, blends, composites, and combinations of two or more different materials of the foregoing;

(P) the source of the spray dryable liquid composition contains spray dryable liquid composition comprising at least one ingredient selected from the group consisting of solvents, carriers, adjuvants, excipients, surfactants, anti-agglomerants, anti-caking agents, co-active ingredients, wetting agents, dispersants, emulsifiers, stabilizers, antioxidants, preservatives, encapsulants, pore-forming agents, hardeners, and mixtures, blends, composites, and combinations of two or more ingredients of the foregoing;

(Q) the source of the spray dryable liquid composition contains an aqueous spray dryable liquid composition;

(R) the source of the spray dryable liquid composition contains spray dryable liquid composition comprising at least one carrier selected from the group consisting of carbohydrates, proteins, lipids, waxes, cellulosic materials, sugars, starches, and natural and synthetic polymeric materials;

(S) the source of the spray dryable liquid composition contains spray dryable liquid composition having a viscosity in a range of from 300 mPa-s to 28,000 mPa-s;

(T) the source of the spray dryable liquid composition contains spray dryable liquid composition having a viscosity in a range of from 500 mPa-s to 16,000 mPa-s;

(U) the source of the spray dryable liquid composition contains spray dryable liquid composition having a viscosity in a range of from 1000 mPa-s to 4000 mPa-s;

(V) the source of the spray dryable liquid composition contains spray dryable liquid composition comprising from 20 to 50% by weight of solvent, based on total weight of the spray dryable liquid composition;

(W) a primary drying fluid source constructed and arranged to provide primary drying fluid to the spray drying vessel at temperature below at least one of 95° C., 90° C., 85° C., 80° C., 75° C., 70° C., 65° C., 60° C., 55° C., 50° C., 45° C., 40° C., 35° C., 30° C., 25° C., and 20° C., and wherein such primary drying fluid temperature is above freezing temperature of solvent in the spray dryable liquid composition, and comprising a secondary drying fluid source constructed and arranged to provide secondary drying fluid to the spray drying vessel at temperature below at least one of 95° C., 90° C., 85° C., 80° C., 75° C., 70° C., 65° C., 60° C., 55° C., 50° C., 45° C., 40° C., 35° C., 30° C., 25° C., and 20° C., and wherein such secondary drying fluid temperature is above freezing temperature of solvent in the spray dryable liquid composition;

(X) a dehumidifier constructed and arranged to provide the primary drying fluid and secondary drying fluid to the interior volume of the spray drying vessel at below 20% relative humidity, e.g., a dehumidifier constructed and arranged to provide the primary drying fluid and secondary drying fluid to the interior volume of the spray drying vessel at relative humidity below at least one of 18%, 15%, 12%, 10%, 8%, 5%, 2.5%, 2%, 1.5%, 1% and 0.5% relative humidity.

In various embodiments, a spray drying apparatus may be utilized, comprising: a spray drying chamber having an interior volume and configured for introduction of spray dryable material into the interior volume for drying therein, and discharge of dried material and drying fluid therefrom; a primary drying fluid inlet configured for introducing primary drying fluid into the interior volume of the chamber for contact with the spray dryable material in the interior volume, to provide a primary drying fluid flow stream through the interior volume; and a multiplicity of secondary drying fluid inlets configured for intermittent injection of secondary drying fluid into the primary drying fluid flow stream to effect transient localized turbulence in the primary drying fluid flow stream, or alternatively for continuous injection of secondary drying fluid into the primary drying fluid flow stream, for enhancement of drying of the spray dryable material in the interior volume of the chamber.

In such spray drying apparatus, the multiplicity of secondary drying fluid inlets may comprise secondary drying fluid inlets arranged in a circumferentially spaced apart arrangement around a circumscribing wall of the spray drying chamber. In various embodiments, the multiplicity of secondary drying fluid inlets may comprise multiple vertically spaced apart rows of secondary drying inlets on the circumscribing wall of the spray drying chamber. The secondary drying inlets in such embodiments may in successively vertically spaced apart rows be circumferentially offset in relation to one another.

The spray drying apparatus as variously described above may comprise a secondary drying fluid assembly coupled with the secondary drying inlets and configured to introduce secondary drying fluid in accordance with a predetermined cycle time program.

The primary drying fluid and secondary drying fluid may be the same as or different from one another, and may comprise air or any other suitable fluid for the specific spray drying operation and apparatus involved.

The spray drying apparatus as variously described above may further comprise a source of spray dryable material arranged in communication with the spray drying chamber interior volume for spray delivery of the spray dryable material to the interior volume of the spray drying chamber.

In various embodiments, the above-described spray drying apparatus may further comprise a dehumidifier configured to provide dehumidified air to the primary drying fluid inlet and to the secondary drying fluid inlets.

The spray drying apparatus may be further constructed and arranged in various embodiments so that intermittent injection of secondary drying fluid into the primary drying fluid flow stream to effect transient localized turbulence in the primary drying fluid flow stream is controlled by an injection controller configured to inject secondary drying fluid through the secondary drying fluid inlets for an injection period in a range of from 0.1 to 100 seconds.

It will be further recognize that the number, pattern, and orientation of the nozzles or other injection devices may be widely varied in the broad practice of the present disclosure. In various embodiments, the nozzles or injection devices may be oriented to inject fluid generally transversely to a main direction of flow of the primary drying fluid flow stream, but it may also be advantageous in other embodiments to direct the secondary drying fluid into the primary drying fluid flow stream at any suitable angle, orthogonal, oblique, acute, etc. with reference to the main direction of flow of the primary drying fluid flow stream, and in still other embodiments, combinations of different orientations of the nozzles or injection devices may be utilized to achieve the desired drying efficiency and character.

In accordance with the present disclosure, a method of spray drying a spray dryable material may be carried out, comprising processing of the spray dryable material in a spray drying apparatus according to any of the embodiments described herein.

In such method, the pressure of the secondary drying fluid intermittently injected into the primary drying fluid flow stream may be in a range of from 1 to 200 psig. The method may be conducted so that the secondary drying fluid is intermittently injected for an injection period in a range of from 1 to 5 seconds, and so that successive injection periods are separated by a non-injection period in a range of from 1 to 5 seconds.

In accordance with the present disclosure, a method of spray drying of a spray dryable material in a primary drying fluid flow stream may be carried out, comprising intermittently, transiently, and cyclically injecting secondary drying fluid into the primary drying fluid flow stream at multiple loci in the primary drying fluid flow stream, so as to create transient localized turbulence at such loci that enhances drying of the spray dryable material, or alternatively, continuously injecting secondary drying fluid into the primary drying fluid flow stream at multiple loci in the primary drying fluid flow stream, so as to create localized turbulence at such loci that enhances drying of the spray dryable material.

Such spray drying method may be carried out as variously described herein, with respect to specific cycle times, pressures, and configurations and arrays of nozzles or other injector devices for providing transient localized turbulence in the primary drying fluid stream in which the sprayed material is to be dried, or for alternatively providing continuous localized turbulence in the primary drying fluid stream in which the sprayed material is to be dried.

In the above-described methods and apparatus of the present disclosure, the primary drying fluid flow stream and the secondary drying fluid may comprise a same fluid, or alternatively may comprise different fluids. In various embodiments, the primary drying fluid and the secondary drying fluid are air. The spray dryable material in such methods and apparatus may be of any suitable type, as previously described, and may for example comprise a flavor, fragrance, food, beverage, comestible, or pharmaceutical material or ingredient.

In the above-described methods and apparatus of the disclosure, the multiple loci in the primary drying fluid flow stream may comprise loci at a peripheral region of the fluid flow stream. The direction of injection of the secondary drying fluid into the primary drying fluid flow stream, as indicated, may be transverse to a direction of flow of the primary drying fluid flow stream. In various embodiments, the multiple loci in the primary drying fluid flow stream may comprise loci that are spaced along a direction of flow of the primary drying fluid flow stream. In other embodiments, the multiple loci may comprise loci that are generally in a same transversely oriented plane in reference to the direction of flow of the primary drying fluid flow stream, as well as loci that are spaced along a direction of flow of the primary drying fluid flow stream. It will be appreciated that the specific patterns of secondary drying fluid injection may be widely varied within the broad practice of the present disclosure.

Thus, although the disclosure specifically contemplates pulsed intermittent injections of fluid into the main drying fluid flow stream in the spray drying chamber, as a preferred mode of operation, embodiments also are contemplated in which the injections of fluid into the main drying fluid flow stream are carried out continuously.

In accordance with the disclosure, a spray drying apparatus may be utilized, comprising: a spray drying chamber having an interior volume and configured for introduction of spray dryable material into the interior volume for drying therein, and discharge of dried material and drying fluid therefrom; a primary drying fluid inlet configured for introducing primary drying fluid into the interior volume of the chamber for contact with the spray dryable material in the interior volume, to provide a primary drying fluid flow stream through the interior volume; and a multiplicity of secondary drying fluid inlets configured for injection of secondary drying fluid into the primary drying fluid flow stream to effect localized turbulence in the primary drying fluid flow stream, for enhancement of drying of the spray dryable material in the interior volume of the chamber, or alternatively for continuous injection of secondary drying fluid into the primary drying fluid flow stream.

In various embodiments, a method of spray drying of a spray dryable material may be performed, comprising use of the apparatus described in the preceding paragraph.

In accordance with the disclosure, a method of spray drying of a spray dryable material in a primary drying fluid flow stream may be conducted, comprising injecting secondary drying fluid into the primary drying fluid flow stream at multiple loci in the primary drying fluid flow stream, so as to create localized turbulence at such loci that enhances drying of the spray dryable material.

The process, apparatus, and systems of the present disclosure may utilize any suitable duty cycle, e.g., a duty cycle within a range of from 1%-100%. In various embodiments, the duty cycle may be in a range of from 1% to 99%, from 1% to 95%, from 5% to 90%, from 10% to 80%, from 15% to 75%, from 25% to 70%, or any other duty cycle range bounded by any one of the aforementioned minimum values and any other mentioned upper values, as appropriate to a specific implementation of the present disclosure.

The process, apparatus, and systems of the present disclosure enable a substantial improvement in the utilization of the drying capacity of the dry air that is supplied to the spray dryer, as compared to utilization levels that are typical of prior conventional spray drying systems. By providing purposefully generated localized turbulent mixing in the spray dryer, a high level of utilization of the drying capacity of the dry air (or other drying fluid) supplied to the spray drying vessel is achieved. This in turn enables the overall efficiency of the spray drying operation to be substantially increased.

In preferred practice, the apparatus, process, and systems of the present disclosure for injected turbulent fluid creation of localized turbulence in the flow stream of drying fluid in a spray drying vessel or a spray drying zone are utilized in low temperature spray drying operations, wherein the temperature of the drying fluid (including both primary (main) drying fluid and secondary drying fluid) is below 100° C. and above the freezing point of the solvent in the material being spray dried.

Figure 6:
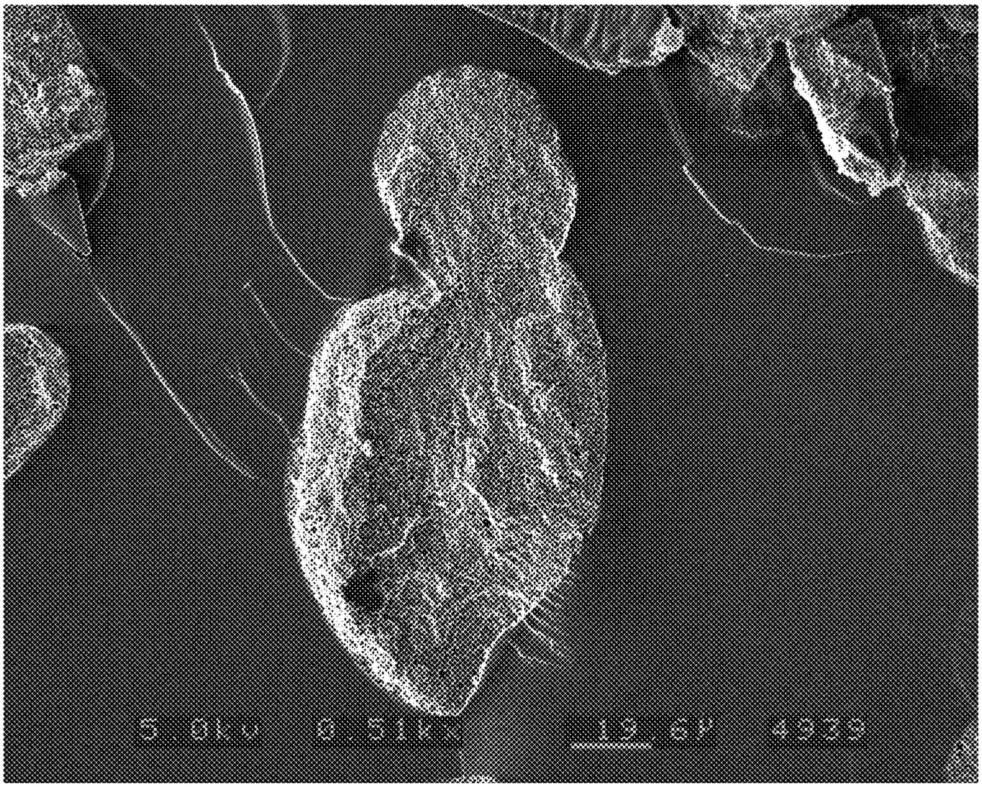
FIG. 6 is a scanning electron microscope (SEM) image of a cross section of a particle produced by low temperature spray drying, as representative of dry powder product produced in accordance with the methods and apparatus of the present disclosure.

FIG. 6 is a scanning electron microscope (SEM) image, at magnification of 0.51 k x, of a cross section of a particle produced by low temperature spray drying, as representative of dry powder product produced in accordance with the methods and apparatus of the present disclosure. As is apparent from the image, the spray dried powder product is highly homogeneous in morphology and appearance, with the active ingredient of the product, visible as black dots, being uniformly dispersed in the (starch) carrier material.

Figure 7:
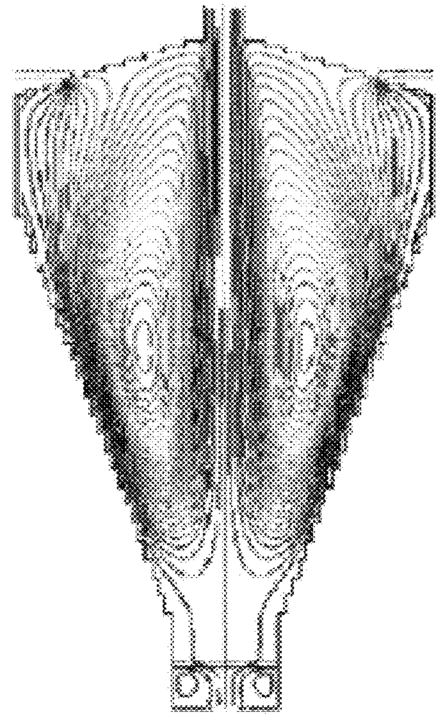
FIG. 7 is a depiction of drying fluid stream lines in a spray drying vessel in which a main flow of drying fluid is introduced at an upper portion of the vessel, with additional drying fluid being introduced for maintenance of a fluidized bed in a lower portion of the spray drying vessel, and with spray drying fluid being discharged from discharge ports at an upper and outer portion of the spray drying vessel.

FIG. 7 is a depiction of drying fluid stream lines in a spray drying vessel in which a main flow of drying fluid is introduced at an upper portion of the vessel, with additional drying fluid being introduced for maintenance of a fluidized bed in a lower portion of the spray drying vessel, and with spray drying fluid being discharged from discharge ports at an upper and outer portion of the spray drying vessel. Such spray drying vessel is of a type more fully described in connection with FIG. 9, but wherein the fluid injector jet augmentation of the spray drying vessel shown in FIG. 9 is not present.

Figure 8:
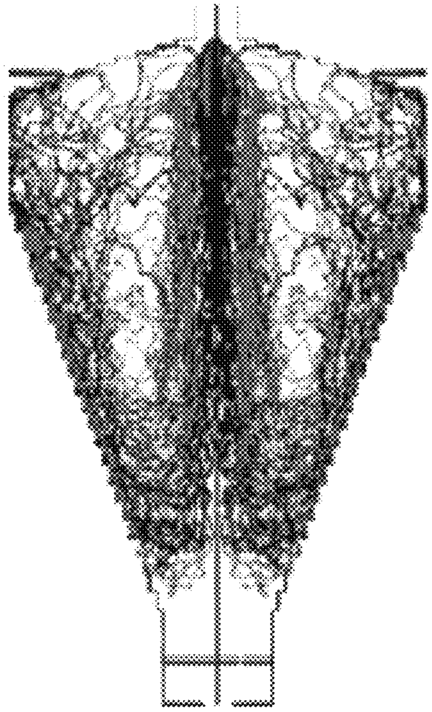
FIG. 8 is a depiction of particle trajectories in a spray drying vessel of the type for which drying fluid stream lines are depicted in FIG. 7.

FIG. 8 is a depiction of particle trajectories in a spray drying vessel of the type for which drying fluid stream lines are depicted in FIG. 7. As is evident in the FIG. 8 depiction, this spray dryer design has large volumes in which the number density of particles is low. These low number density volumes are a source of loss of drying efficiency. Particle residence times in this type of spray dryer may be on the order of 10-15 seconds, which necessitates a fluidized bed arrangement in a lower portion of the spray drying vessel, in order to achieve spray drying of the spray dryable feed material to a dry powder product.

Figure 9:
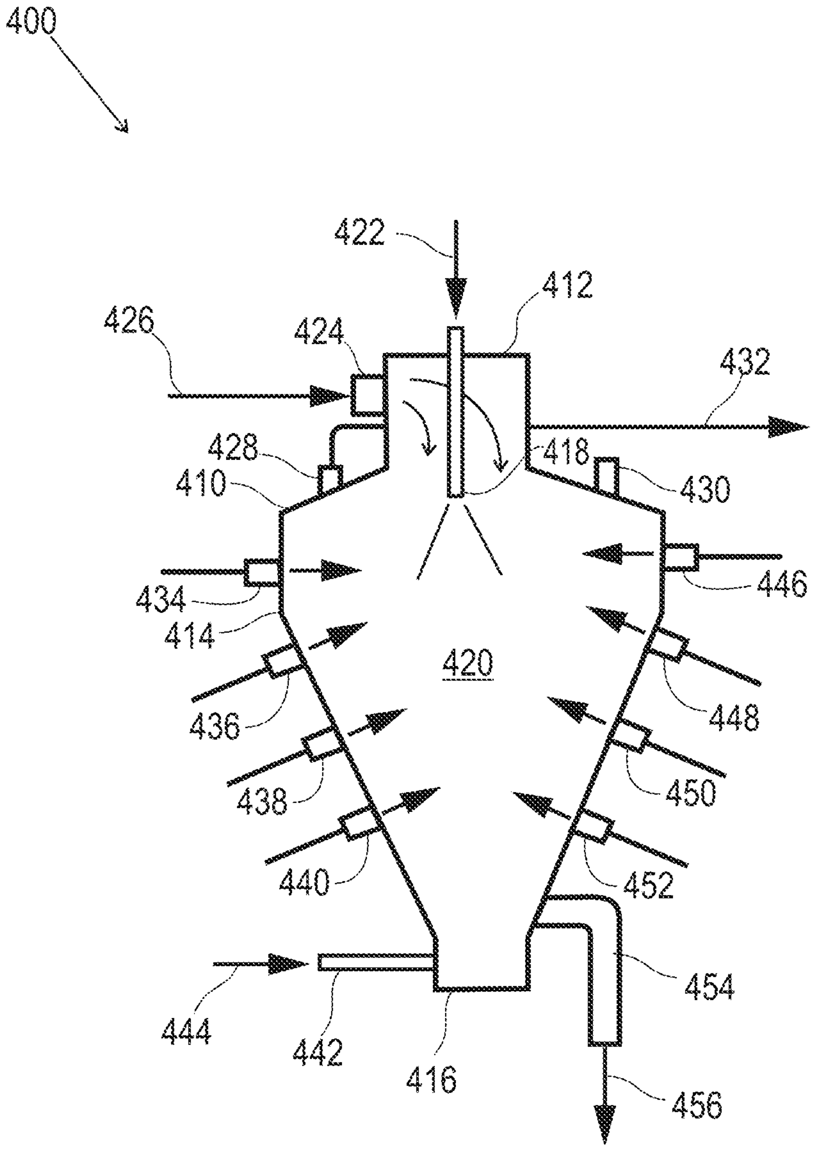
FIG. 9 is a schematic representation of a spray drying system according to another embodiment of the present disclosure, featuring an array of fluid injector jets on the spray drying vessel wall to enhance spray drying efficiency of the system.

FIG. 9 is a schematic representation of a spray drying system according to another embodiment of the present disclosure, comprising a spray drying vessel of the general type for which air stream lines and particle trajectories are shown in FIGS. 7 and 8, respectively, but wherein an array of fluid injector jets is provided, mounted on the spray drying vessel wall and arranged to inject fluid into the interior volume of the vessel, to enhance spray drying efficiency of the system.

The FIG. 9 spray drying system 400 comprises a spray drying vessel 410 having an inlet 412 at its upper end portion in which is mounted an atomizer nozzle 418 as shown. The atomizer nozzle 418 receives spray dryable material via spray dryable material feed line 422, and the atomizer nozzle generates a spray of particles of the material to be spray dried, as discharged into the interior volume 420 of the spray drying vessel for contact with drying fluid therein.

The spray drying vessel 410 includes a main chamber portion 414, and a lower portion 416. The lower portion 416 is adapted for fluidized bed operation, being supplied by drying fluid inlet 442 from drying fluid feed line 444 with drying fluid that is introduced so as to effect fluidization of particles in the lower portion of the spray drying vessel. This in situ fluidized bed in the lower portion of the spray drying vessel is necessary to achieve a spray dried powder product, due to the previously noted short residence time of sprayed particles in the fluidized bed. The spray drying vessel 410 includes drying fluid discharge ports 428 and 430 at the upper and outer portion of the spray drying vessel, at which drying fluid is discharged from the spray drying vessel and is exhausted in the drying fluid exhaust line 432.

A main flow of drying fluid 426 is introduced to the spray drying vessel 410 at the drying fluid inlet 424 and the introduced drying fluid subsequently flows downwardly in the spray drying vessel for contact with the sprayed particles of spray dryable material in the interior volume 420 of the vessel.

The spray drying vessel 410 has a dried material discharge conduit 454 at its lower portion, above the upper end of the fluidized bed, through which dried material is discharged to a dried material product line 456 for transport to downstream packaging facilities and/or other post-spray-drying processing operations.

The spray drying vessel 410 is provided at its main chamber portion with an array of fluid injector jets 434, 436, 438, 440, 446, 448, 450, and 452, arranged as shown. Each of the fluid injector jets is coupled with a source of pressurized fluid, and the injector jets may comprise fluid injection flow control valves that are modulatable between fully open and fully closed valve positions, to correspondingly modulate flow of pressurized fluid through the fluid injector jets into the interior volume 420 of the spray drying vessel. In this manner, turbulent inputs of pressurized fluid are introduced into the main flow of drying fluid circulating in the interior volume of the spray drying vessel, as introduced in drying fluid inlet 424 and exhausted from the vessel in drying fluid discharge ports 428 and 430.

The pressurized fluid injector jets may variously be arranged for continuous or alternatively intermittent input of pressurized turbulent fluid into the spray drying vessel, and in the case of intermittent input operation may be operated in a sequential and repetitive cyclic manner, with a specific one or ones of the array of fluid injector jets "firing" (opening to emit a burst of pressurized turbulent fluid into the vessel), while the other fluid injector jets in the array are quiescent with closed fluid injection flow control valves therein, followed by closure of the fluid injection flow control valve(s) of such fluid injector jet(s)), concurrent with or followed by firing of other fluid injector jets in a controlled pattern, so that the fluid in the interior volume of the spray drying vessel, in contact with the sprayed material particles, is actively stirred by the successive bursts of pressurized turbulent fluid into the interior volume of the vessel.

Such active stirring by operation of the pressurized turbulent fluid injector jets serves to homogenize the solvent vapor (e.g., water vapor) concentration in the spray drying vessel interior volume and lowers the partial pressure of solvent vapor in the fluid in contact with the particles, thereby enhancing mass transfer of solvent from the particle to the drying fluid, as well as increasing particle residence time in the dryer by keeping the particles suspended in the spray drying vessel for longer periods of time.

Accordingly, use of pressurized turbulent fluid injector jets in accordance with the present disclosure is able to achieve remarkable enhancement in particle residence times and drying efficiency. This enhancement is most pronounced in low temperature operation in which temperature of the drying fluid introduced into the spray drying vessel for contact with the sprayed particles is below 100° C., since such low temperature operation avoids formation of the dense surface layer that otherwise is formed in high temperature spray drying processes (e.g., in which the drying fluid is introduced into the spray drying vessel at temperatures on the order of 180° C.-200° C.).

Thus, the low temperature spray drying process, with spray drying fluid inlet temperature ≤100° C., can be carried out with high rates of mass transfer of the solvent from the sprayed particles to the drying fluid, without the diffusional impedance represented by the dense surface layer (skin) associated with high temperature spray drying, and with the rate of mass transfer of solvent from the sprayed particles to the drying fluid being remarkably enhanced by the injection of pressurized turbulent fluid into the drying fluid in the spray drying vessel in accordance with the present disclosure.

By way of a specific illustrative example, a low temperature spray dryer having a spray drying vessel circumference of 34.3 feet is constructed and arranged for operation with inlet temperature of the primary drying fluid (air) to the spray drying vessel being below 100° C. The spray drying vessel may be outfitted with 16 pressurized turbulent fluid injector jets located along the circumference of the spray dryer in two rings of 8 jets each, with the jets being equally spaced along the dryer circumference, for injection of pressurized turbulent air. One ring may be located 3 feet down from the top of the dryer and the second ring of 8 nozzles may be located at 7 feet down from the top of the dryer. The nozzles may be oriented so that the direction of flow of air is positioned 10 degrees off of the radial direction and in the direction of the primary drying fluid air flow. The pressurized turbulent fluid injector jets may be activated in radially opposing pairs, pulsing on for 3 seconds, then after a delay of 1 second, the next adjacent pair may be pulsed on for three seconds and repeated continuously, with similar operation being carried out by the second ring of pressurized turbulent fluid injector jets. The pressurized turbulent fluid injector jets may be pressurized to 100 psi.

Figure 10:
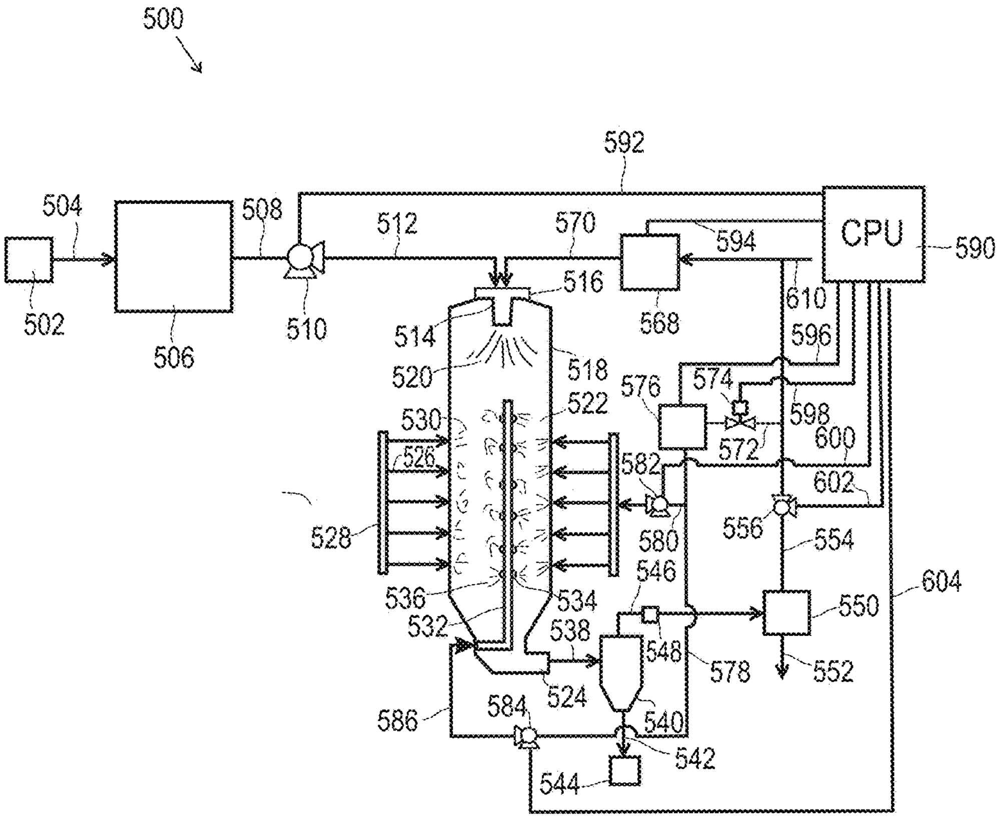
FIG. 10 is a schematic representation of a spray drying process system according to a further embodiment of the present disclosure.

FIG. 10 is a schematic representation of a spray drying process system according to a further embodiment of the present disclosure.

As shown, the spray drying system 500 includes a feedstock precursor composition source 502, from which which a feedstock precursor composition is flowed in feed line 504 to a feedstock composition processing unit 506, in which the precursor composition is processed or treated to yield the spray dryable liquid composition. Such upstream processing unit may be of any suitable type, and may for example comprise a concentration unit in which the product material to be spray dried is concentrated from a feedstock precursor composition concentration to a higher product material concentration in the spray dryable liquid composition discharged from the unit in line 508.

The spray dryable liquid composition may comprise a carrier or alternatively may be carrier-free in character.

As used herein, the term "carrier" refers to a solid material that is utilized in a spray dryable liquid composition, containing liquid and the product to be spray dried, to carry and at least partially support or at least partially encapsulate the product in the spray dried powder resulting from the spray drying operation. Carriers thus may be associated with the product material in spray dried powders, e.g., as a substrate, support, or associative matrix for the product material. Carriers used in spray drying operations may be of widely varying types, and may include, for example, the starch carriers disclosed in U.S. Pat. Nos. 8,939,388, 9,332,776, and 9,551,527. More generally, carriers such as those listed in Table 1 below illustrate specific carrier materials.

TABLE 1

| Spray Drying Carriers |
|---|
| Polysaccharides: |
| starches, modified food starches, native starches, maltodextrins, alginates, pectins, methylcellulose, ethylcellulose, hydrocolloids, inulin, carbohydrates, mono-, di- and tri-saccharides, soluble fibers, polydextrose |
| Proteins: |
| animal proteins, plant proteins, caseinates, gelatins, soy proteins, pea proteins, whey proteins, milk proteins |
| Gums: |
| guar gum, xanthan gum, acacia gum (gum arabic), gellan gum, and caragenan |
| Esters: |
| Polysorbates, stearic acid esters, oleic acid esters |
| Lipids and waxes: |
| coconut oil, medium chain triglyceride (MCT) oils, vegetable oils, sunflower oils, palm oils, caruba waxes, bee waxes |

As used herein, the term “carrier-free” in reference to a spray dryable liquid composition means a spray dryable liquid composition that is devoid of a carrier therein, and “carrier-free” in reference to a spray drying process means a spray drying process carried out in the absence of a carrier in the spray drying operation.

Referring again to FIG. 10, the spray dryable liquid composition is flowed from the feedstock composition processing unit 506 in liquid composition feed line 508 by pump 510 to feedstock feed line 512, from which it flows into the spray dryer inlet 516 of the spray dryer vessel 518, and thereupon is atomized by the atomizer 514 to generate an atomized spray 520 of the spray dryable liquid composition. Concurrently, conditioned drying fluid described more fully hereinafter is flowed in conditioned drying fluid feed line 570 to the inlet 516 of the spray dryer vessel 518, so that the introduced conditioned drying fluid flows through the interior volume 522 of the spray dryer vessel 518, for contact with the atomized spray of spray dryable liquid composition.

The conditioned drying fluid, or any portion thereof, may be flowed through the atomizer 514, in a so-called two-fluid atomization, or the conditioned drying fluid may be flowed into the interior volume 522 of the spray drying vessel 518 as a separate stream, in relation to the introduction of the spray dryable liquid composition and its passage through the atomizer 514.

The atomizer 514 may be of any suitable type, and may for example include any of rotary atomizers, centrifugal atomizers, jet nozzle atomizers, nebulizers, ultrasonic atomizers, etc., and combinations of two or more of the foregoing. The atomizer may be electrohydrodynamic to carry out electrohydrodynamic spray drying of the concentrated feedstock composition, or the atomizer may be non-electrohydrodynamic in character.

Regardless of the specific atomizer type and mode of atomization employed, the atomized spray 520 of feedstock composition is introduced to the interior volume 522 of the spray drying vessel 518, and the atomized droplets of the spray dryable liquid composition are contacted with the conditioned drying fluid during their passage through the interior volume to the spray dryer outlet 524, to dry the atomized droplets and produce the spray dried dry powder product.

The spray drying vessel 518 may optionally be provided with auxiliary drying fluid peripheral feed lines 526, in which the arrowheads of the respective schematic feed lines 526 designate injector jets arranged to introduce auxiliary drying fluid into the interior volume 522 of the spray drying vessel 518. The feed lines 526 and injector jets thereof thus may pass through corresponding wall openings in the spray drying vessel 518 so that the injector jets are internally arrayed, or the injector jets may be arranged so that they communicate with wall openings in the spray drying vessel, injecting auxiliary drying fluid therethrough into the interior volume 522. The auxiliary drying fluid may be introduced into the interior volume of the spray drying vessel at sufficient pressure and flow rate to generate localized turbulence 530 at or near the point of introduction into the interior volume of the spray drying vessel.

The auxiliary drying fluid peripheral feed lines 526 are illustrated as being coupled with an auxiliary drying fluid manifold 528 through which the auxiliary drying fluid is flowed to the respective feed lines 526. The auxiliary drying fluid may be introduced into the interior volume of the spray drying vessel in a continuous manner, or in an intermittent manner. The auxiliary drying fluid may be introduced in bursts, e.g., in a time-sequenced manner, and the injector jets may be programmably arranged under the monitoring and control of a central processor unit such as the CPU 590 illustrated in FIG. 10.

Such localized induction of turbulence is highly effective in enhancing the diffusivity and mass transfer of liquid from the atomized droplets of concentrated feedstock composition to the drying fluid present in the spray drying vessel.

The spray drying vessel 518, as a further enhancement of the drying of the atomized droplets of concentrated feedstock composition in the interior volume of the vessel, may be equipped with an auxiliary drying fluid central feed line 532 as shown. The auxiliary drying fluid central feed line 532 is provided with a series of longitudinally spaced-apart auxiliary drying fluid central feed line injector jets 534, in which auxiliary drying fluid may be injected under sufficient pressure and flow rate conditions to generate auxiliary drying fluid injected turbulence regions 536.

As discussed above with respect to the auxiliary drying fluid introduced into the interior volume of the spray drying vessel through the feed lines 526 and associated injector jets, the auxiliary drying fluid may be introduced into the interior volume of the spray drying vessel in a continuous manner, or in an intermittent manner from the injector jets 534, to provide auxiliary drying fluid injected turbulence regions 536 at a central portion of the interior volume 522 in the spray drying vessel. As discussed in connection with the peripheral feed lines and associated injector jets, the auxiliary drying fluid may be introduced through the central feed line injector jets 534 in bursts, e.g., in a time-sequenced manner, and the injector jets may be programmably arranged under the monitoring and control of a central processor unit such as the CPU 590 illustrated in FIG. 10.

A combination of peripheral jets and central jets such as shown in FIG. 10 may be used to provide localized turbulence in the central region as well as the outer wall region of the interior volume in the spray dryer vessel, and effects a remarkably efficient spray drying process, in which anomalous flow behavior, such as dead zones or stagnant regions in the interior volume, is minimized. A highly favorable hydrodynamic mass transfer environment is correspondingly provided, and the spray dryer vessel as a result of such localized turbulence generation capability can be substantially reduced in size and associated footprint, thereby enabling smaller pumps, compressors, blowers and other associated ancillary equipment to be employed, with consequent enhancement of the capital equipment and operating cost characteristics of the concentration and spray drying system.

The spray dried powder and effluent drying gas that are produced by the contacting of the atomized droplets of concentrated feedstock composition with drying fluid in the interior volume of the spray dryer vessel, are discharged from the spray dryer vessel in spray dryer outlet 524 and flow in spray dryer effluent line 538 to cyclone 540. In lieu of cyclone equipment, any other suitable solids/gas separation unit of appropriate character may be employed. The cyclone 540 separates dried solids from the drying fluid, with the dried solids flowing in dried solids discharge line 542 to a dried solids collection vessel 544. The drying fluid depleted in solids content flows from the cyclone in drying fluid discharge line 546, flowing through fines filter 548 to condenser 550. In the condenser 550, the drying fluid is cooled, resulting in condensation of condensable gas therein, with condensate being discharged from the condenser in condensate discharge line 552.

The resulting condensate-depleted drying fluid then flows in drying fluid recycle line 554 containing pump 556 therein to the drying fluid conditioning assembly 568, together with any needed make-up drying fluid introduced in drying fluid make-up feed line 610. The drying fluid conditioning assembly conditions the recycle drying fluid and any added make-up drying fluid for flow to the spray dryer vessel 518 in conditioned drying fluid feed line 570. The drying fluid conditioning assembly may comprise a dehumidifier and/or heat exchange (heater/cooler) equipment to provide drying fluid for recycle at appropriate desired conditions of temperature and relative humidity.

Thus, drying fluid, including any necessary make-up drying fluid, may be provided to the drying fluid conditioning assembly 568, or otherwise provided to the spray drying system at other appropriate location(s) in the system, from an appropriate source, and with any appropriate preconditioning operations being carried out by associated equipment or devices, as needed to conduct the spray drying operation at the desired temperature, pressure, flow rate, composition, and relative humidity. Thus, for example, make-up drying fluid may be provided to the conditioning assembly 568 from a tank, storage vessel, or other source (e.g., the ambient atmosphere, in the case of air as such drying fluid).

As a source of auxiliary drying fluid in the system, a portion of the recycled drying fluid from drying fluid recycle line 554 may be diverted in auxiliary drying fluid feed line 572 containing flow control valve 574, to the auxiliary drying fluid conditioning assembly 576. The auxiliary drying fluid conditioning assembly 576 may be constructed and arranged in any suitable manner, and may be of a same or similar character to the construction and arrangement of the drying fluid conditioning assembly 568. The auxiliary drying fluid conditioning assembly 576 thus conditions the auxiliary drying fluid so that it is at appropriate condition for the use of the auxiliary drying fluid in the system.

The conditioned auxiliary drying fluid flows from auxiliary drying fluid conditioning assembly 576 through auxiliary drying fluid feed line 578, from which it flows in auxiliary drying fluid feed line 580 containing pump 582 to the manifold 528, while the remainder of the conditioned auxiliary drying fluid flows in auxiliary drying fluid feed line 578 to pump 584, from which it is flowed in auxiliary drying fluid feed line 586 to the auxiliary drying fluid central feed line 532, for introduction in the central region of the interior volume of the spray dryer vessel, as previously described.

It will be recognized that the system shown in FIG. 10 could be alternatively constructed and arranged with the drying fluid conditioning assembly 568 processing both the main flow of drying fluid and the auxiliary drying fluid, without the provision of a separate auxiliary drying fluid conditioning assembly 576, e.g., when the main drying fluid and auxiliary drying fluid are of a substantially same character with respect to their relevant fluid characteristics. It will also be recognized that separate flow circulation loops for each of the main drying fluid and auxiliary drying fluid may be provided, when the main drying fluid and auxiliary drying fluid are or comprise different gases, or are otherwise different in their relevant fluid characteristics.

The FIG. 10 system is shown as including a central processor unit (CPU) 590 arranged to conduct monitoring and/or control operations in the system, and when employed in a controlling aspect, may be employed to generate control signals for modulation of equipment and/or fluids conditions, to maintain operation at set point or otherwise desired operational conditions. As mentioned, the CPU could be operationally connected to the conditioning assemblies 568 and 576, to control components thereof such as dehumidifiers, thermal controllers, heat exchange equipment, etc.

The CPU 590 is illustratively shown in FIG. 10 as being operatively coupled by monitoring and/or control signal transmission lines 592, 594, 596, 598, 600, 602, and 604 with pump 510, drying fluid conditioning assembly 568, auxiliary drying fluid conditioning assembly 576, flow control valve 574, pump 582, pump 556, and pump 584, respectively.

It will be recognized that the specific arrangement of the CPU shown in FIG. 10 is of an illustrative character, and that the CPU may be otherwise arranged with respect to any components, elements, features, and units of the overall system, including the concentration unit 506, to monitor any suitable operational components, elements, features, units, conditions, and parameters, and/or to control any suitable operational components, elements, features, units, conditions, parameters, and variables. For such purpose, as regards monitoring capability, the system may comprise appropriate sensors, detectors, components, elements, features, and units. The signal transmission lines may be bidirectional signal transmission lines, or may constitute cabling including monitoring signal transmission lines and separate control signal transmission lines.

It will be appreciated that the spray drying system may be embodied in arrangements in which the contacting gas, auxiliary contacting gas, drying fluid, and auxiliary drying fluid, or any two or more thereof, may have a substantially same composition, temperature, and/or relative humidity, thereby achieving capital equipment and operating cost efficiencies with corresponding simplification of the system requirements. Thus, for example, all of the contacting gas, auxiliary contacting gas, drying fluid, and auxiliary drying fluid may be air, nitrogen, argon, or other gas from a common gas source, and such common gas may be provided at a substantially same temperature and relative humidity, so that common thermal conditioning and dehumidification equipment can be employed.

It will thus be apparent that many varied arrangements and modes of operation of the pressurized turbulent fluid injector jets may be implemented in the broad practice of the present disclosure, to achieve ultrahigh efficiency spray drying operation in a wide variety of spray drying vessels and systems.

The present disclosure in another aspect relates to a spray drying system, comprising:

(a) a spray drying vessel comprising:

(i) an interior volume arranged to receive an atomized spray-dryable material and drying fluid for contacting of the atomized spray-dryable material with the drying fluid in the interior volume;

(ii) at least one drying fluid inlet by which the drying fluid is introduced into the interior volume for such contacting; and (iii) a spray-dried material outlet communicating with the interior volume, arranged to discharge spray-dried material and effluent drying fluid from the vessel;

(b) an atomizer adapted to receive a spray-dryable material and discharge the atomized spray-dryable material into the interior volume of the vessel for such contacting;

(c) at least one turbulator adapted to generate turbulence in the drying fluid in the interior volume of the vessel;

(d) a process control unit adapted to regulate flow rate of drying fluid into the interior volume and flow rate of the spray-dryable material to the atomizer so that interaction of the drying fluid with the at least one turbulator produces turbulence in the drying fluid having a Kolmogorov length less than average particle size of spray-dryable material droplets in the atomized spray-dryable material in the interior volume of the vessel.

As used herein in reference to the spray drying system of the present disclosure, the term "turbulator" refers to a device that is configured to induce turbulence in drying fluid being contacted with the atomized spray-dryable material. The device may be of any suitable type, and may include any one or more jets, nozzles, injectors, and the like that are utilized for injection of secondary drying fluid into a body of primary drying fluid so as to induce turbulence in the drying fluid for enhancement of the spray-drying operation. The device may alternatively be of a structural type that in interaction with the drying fluid induces turbulence in the drying fluid, e.g., twisted tapes, static mixer devices, airfoils, Brock turbulators, wire turbulators, coil turbulators, and wall protrusion turbulators. Various kinds of such devices may be combined with one another in various embodiments, as may be desirable to achieve suitable intensity of turbulence for enhancement of the rate and/or extent of drying of the atomized spray-dryable material.

The above-discussed spray drying system reflects the discovery that substantial and unexpected increase in the rate and extent of spray drying can be achieved by inducing turbulence in the drying fluid, in which the turbulence in the drying fluid is characterized by a Kolmogorov length that is less than average particle size of spray dryable material droplets in the atomized spray-dryable material. The Kolmogorov length $\eta$ is defined by the equation $$\eta = \sqrt[\frac{1}{4}]{\frac{\nu^3}{\varepsilon}},$$

where v is the kinematic viscosity of the drying fluid, and ε is the rate of dissipation of kinetic energy in the induced turbulence in the drying fluid, as discussed more fully below.

Measurement of Kolmogorov Length Scale

In accordance with various aspects of the present disclosure, the Kolmogorov length is utilized to characterize the turbulence that is induced in the spray drying operation by the turbulator components associated with the spray drying vessel.

The Kolmogorov length characterizes the energy dissipating eddies in the turbulence induced by the turbulator(s) in the fluid flow in the interior volume of the spray drying vessel. The turbulent kinetic energy in such flow can be described in terms of a kinetic energy cascade that develops spatiotemporally in the fluid in the interior volume of the spray drying vessel after turbulence is initiated. The energy introduced by the turbulator(s) into the fluid in the spray drying vessel, by fluid injection or by flow disruption, generate hydrodynamic instabilities at large scales, typically characterized as the integral scale. The energy at the integral scale then is transferred to progressively smaller scales, initially through inviscid mechanisms such as vortex stretching, and subsequently through viscous dissipation into heat. When graphically shown on a logarithmic plot of energy as a function of wave number, the discrete regimes of an initial energy-containing range reflecting the induced turbulence, followed by an inertial range, followed by a final dissipation range are readily visualized as depicting an energy cascade, with large eddies at the low wave number region transforming to ever smaller eddies and ultimately dissipating into heat. The scale at which the dissipative decay begins is the Kolmogorov scale $$\eta = \sqrt[\frac{1}{4}]{\frac{\nu^3}{\varepsilon}}$$

wherein ε is the turbulence dissipation rate shown in the logarithmic plot and v is the kinematic viscosity of the drying fluid.

The turbulent dissipation rate and Kolmogorov length are readily determined using standard hot wire anemometry or laser Doppler anemometry techniques. For example, hot wire anemometry may be employed to generate values of turbulence power density at a range of frequencies, with a log-log plot of turbulence power density as a function of frequency, in Hertz, depicting the induced turbulence, inertial range, and dissipation range of the cascade, and with the dissipation range values enabling the turbulence dissipation rate to be determined, from which Kolmogorov length can be calculated from the above Kolmogorov scale formula.

Advantageously, turbulence is induced in at least 5 volume % of the volume of drying fluid in the interior volume of the vessel to provide substantial enhancement of the spray-drying operation. More generally, the turbulence may be induced in at least 5, 10, 15, 20, 25, 30, 35, 40, 45, 50, 55, 60, 65, 70, 75, 80, 85, 90, 95, or more volume % of the volume of drying fluid in the interior volume of the vessel. Thus, it is advantageous to maximize the amount of the drying fluid in which turbulence is induced, and the volumetric proportion of the drying fluid in the interior volume of the vessel in which turbulence is induced may beneficially include the drying fluid that is in contact with the atomizer, so that turbulence is induced as soon as possible as the drying fluid is introduced and contacted with the atomized spray-dryable material.

By inducing turbulence in the drying fluid in accordance with the present disclosure, dramatic improvements in throughput and efficiency of spray dryers can be achieved. The induction of turbulence has major benefit in reducing or eliminating deposition of spray-dryable material on the interior wall surfaces of the spray dryer vessel.

The enhancement achieved by inducing turbulence in accordance with the present disclosure enables increased dryer throughput for a fixed interior volume in the spray dryer, or alternatively, the design of higher efficiency, smaller volume spray dryers with higher throughput, thereby achieving capital equipment savings as well as reduction in operating costs in many instances.

In instances in which average particle size of spray-dryable material droplets in the atomized spray-dryable material in the interior volume of the spray-drying vessel is in a range of 50 to 300 μm, it is desirable to induce turbulence in the drying fluid in the spray drying operation so that the turbulent dissipation rate exceeds 25 $m^2/sec^3$. The spray drying operation in accordance with the present disclosure may be conducted to produce spray dried powders of average particle size in the aforementioned range of 50 to 300 μm, or in other suitable ranges such as 75 to 250 μm, 80 to 200 μm, 85 to 150 μm, 90 to 120 μm, or other lower or higher ranges. In general, the spray drying operation is advantageously conducted so that the turbulent dissipation rate is greater than at least one of 5, 10, 15, 20, 25, 30, 35, 40, 45, 50, 55, 60, 65, 70, 75, 80, 85, 90, 95, 100, 150, 200, 250, 300, 400, 500, 600, 700, 800, 900, or 1000, $m^2/sec^3$, e.g., in specific ranges in which the lower end point value is one of the aforementioned numeric values and the upper end point value is one of the aforementioned numeric values exceeding the lower end point value.

Thus, the spray drying system may include at least one turbulator that comprises one or more nozzles configured to inject pressurized secondary drying fluid into the interior volume of the vessel, e.g., an array of nozzles in a geometrically regular or irregular arrangement.

Additionally, or alternatively, the at least one turbulator employed in the spray drying system may comprise any one or more of twisted tapes, static mixer devices, airfoils, Brock turbulators, wire turbulators, coil turbulators, and wall protrusion turbulators.

In the spray drying system, the atomizer may be of any suitable type and may for example comprise nozzle atomizers, applied charge atomizers, nebulizers, rotary atomizers, ultrasonic atomizers, or atomizers of any other suitable type.

The spray drying system as above described may operationally comprise a drying fluid source coupled to the at least one drying fluid inlet in drying fluid supply relationship with the spray drying vessel. Such drying source may be constituted to supply the drying fluid to the at least one drying fluid inlet of the spray drying vessel, with the drying fluid comprising air, oxygen-enriched air, oxygen, nitrogen, argon, krypton, neon, helium, or a gas mixture comprising two or more of the foregoing drying fluid species. In various embodiments, the drying fluid source may be constituted to supply the drying fluid to the at least one drying fluid inlet of the spray drying vessel at temperature below at least one of 120° C., 115° C., 110° C., 100° C., 95° C., 90° C., 85° C., 80° C., 75° C., 70° C., 65° C., 60° C., 55° C., 50° C., 45° C., 40° C., 35° C., 30° C., 25° C., and 20° C., and above freezing temperature of liquid to be volatilized for spray drying of the spray-dryable material.

In various embodiments, the drying fluid source may be constituted to supply the drying fluid to the at least one drying fluid inlet of the spray drying vessel at temperature below 100° C., and above freezing temperature of liquid to be volatilized for spray drying of the spray-dryable material.

The spray drying system variously described above may operationally comprise a spray-dryable material source arranged in spray-dryable material supply relationship to the atomizer.

The spray drying system in various implementations may utilize a spray-dryable material source comprising the spray-dryable material in a carrier-free composition. Alternatively, the spray dryable material source may comprise the spray-dryable material in a carrier-comprising composition.

The spray drying system as variously described above may be constructed and arranged so that the process control unit is adapted to regulate flow rate of drying fluid into the interior volume and flow rate of the spray-dryable material to the atomizer so that the average particle size of the spray-dryable material droplets in the atomized spray-dryable material in the interior volume of the vessel is in a range of from 50 to 300 μm.

In specific embodiments, the process control unit may be adapted to regulate flow rate of drying fluid into the interior volume and flow rate of the spray-dryable material to the atomizer so that turbulence dissipation rate of said turbulence exceeds 25 $m^2/sec^3$.

In general, the process control unit may be constructed and arranged to induce turbulence in the drying fluid in any suitable manner. For example, the process control unit may be configured to produce intermittent turbulence in the drying fluid, or the process control unit may be configured to produce continuous turbulence in the drying fluid.

The variously above-described spray drying system may be configured for applied charge spray drying (commonly referred to as electrostatic spray drying).

The disclosure in a further aspect relates to a process for producing a spray-dried material, comprising:

generating an atomized spray-dryable material;

contacting the atomized spray-dryable material with drying fluid to form spray-dried material;

recovering the spray-dried material from the drying fluid; and during such contacting, inducing turbulence in the drying fluid having a Kolmogorov length less than average particle size of spray-dryable material droplets in the atomized spray-dryable material.

The process may be conducted, in which the turbulence is induced in at least 5 volume % of the volume of drying fluid engaged in the contacting, e.g., in at least 5, 10, 15, 20, 25, 30, 35, 40, 45, 50, 55, 60, 65, 70, 75, 80, 85, 90, 95, or more volume % of the volume of drying fluid engaged in the contacting.

The turbulence in such process may be induced by injection of pressurized secondary drying fluid. Additionally, or alternatively, the turbulence may be induced by interaction of the drying fluid with a turbulator comprising at least one selected from among twisted tapes, static mixer devices, airfoils, Brock turbulators, wire turbulators, coil turbulators, and wall protrusion turbulators.

In the process, the atomized spray-dryable material may be generated by an atomizer comprising at least one selected from among nozzle atomizers, applied charge atomizers, nebulizers, rotary atomizers, and ultrasonic atomizers. Alternatively, any other suitable type or types of atomizer may be employed.

The spray-drying process may be conducted, in which the drying fluid comprises air, oxygen-enriched air, oxygen, nitrogen, argon, krypton, neon, helium, or a gas mixture comprising two or more of the foregoing drying fluid species.

The process may be conducted, in which the drying fluid is introduced to the contacting at temperature below at least one of 120° C., 115° C., 110° C., 100° C., 95° C., 90° C., 85° C., 80° C., 75° C., 70° C., 65° C., 60° C., 55° C., 50° C., 45° C., 40° C., 35° C., 30° C., 25° C., and 20° C., and above freezing temperature of liquid to be volatilized to form the spray-dryable material.

The process may be conducted, in which the average particle size of the spray-dryable material droplets in the atomized spray-dryable material in the contacting is in a range of from 50 to 300 μm.

the process may be conducted, in which turbulence dissipation rate of the turbulence induced during said contacting exceeds 25 $m^2/sec^3$.

In various embodiments, the process may be carried out, in which the drying fluid is introduced to the contacting at temperature below 100° C. and above freezing temperature of liquid to be volatilized to form the spray-dried material.

The process may be carried out in which the atomized spray-dryable material is carrier-free, or alternatively, wherein the atomized spray-dryable material comprises a carrier.

The process is susceptible to operation in which turbulence is induced intermittently during the contacting, or alternatively, the turbulence may be induced continuously during the contacting.

As alluded to above, in the discussion of the spray drying system, the process may be carried out in which the spray-dryable material droplets in the atomized spray-dryable material are electrically charged.

The disclosure in a further aspect relates to a spray drying system, comprising:

(a) a spray drying vessel comprising:
- (i) an interior volume arranged to receive an atomized spray-dryable material and drying fluid for contacting of the atomized spray-dryable material with the drying fluid in the interior volume;
- (ii) at least one drying fluid inlet by which the drying fluid is introduced into the interior volume for said contacting; and
- (iii) a spray-dried material outlet communicating with the interior volume, arranged to discharge spray-dried material and effluent drying fluid from the vessel;

(b) an atomizer adapted to receive a spray-dryable material and discharge the atomized spray-dryable material into the interior volume of the vessel for said contacting;

(c) at least one turbulator adapted to generate turbulence in the drying fluid in the interior volume of the vessel;

(d) a process control unit adapted to regulate flow rate of drying fluid into the interior volume and flow rate of the spray-dryable material to the atomizer so that interaction of the drying fluid with the at least one turbulator produces turbulence in the drying fluid producing a turbulence dissipation rate exceeding 25 $m^2/sec^3$.

Such spray drying system may be utilized with any of the components, features, and accessories described hereinabove. For example, such spray drying system may be adapted for low temperature operation, such as at temperature below 100° C. of the drying fluid introduced to the interior volume of the spray drying vessel, as previously described herein.

The disclosure relates in a further aspect to a process for producing a spray-dried material, comprising:

generating an atomized spray-dryable material;

contacting the atomized spray-dryable material with drying fluid to form spray-dried material;

recovering the spray-dried material from the drying fluid; and during said contacting, inducing turbulence in the drying fluid producing a turbulence dissipation rate exceeding 25 $m^2/sec^3$.

Such spray drying process may likewise be implemented with any of the conditions, limitations, and specifications described hereinabove. For example, such spray drying process may be adapted for low temperature operation, such as that temperature below 100° C. of the drying fluid contacted with the atomized spray-dryable material, as previously described herein.

The features, aspects, and advantages of the spray drying system and process of the present disclosure are further understood with respect to the following illustrative Example.

Example 1

A comparison was made of two low temperature operation spray dryers. Both dryers are constructed and arranged to operate with an inlet air temperature of the drying fluid of 42° C., and drying fluid relative humidity <1%. Dryer 1 has an internal volume of 12,175 gallons (53.6 $m^3$), while Dryer 2 has an internal volume of 3,870 gallons (17.05 $m^3$). Both dryers employ identical atomizers operating under identical conditions. The volumetric airflow in Dryer 1 is 2200 cfm, while that in Dryer 2 is 1800 cfm. Dryer 1 has a simple swirl type inlet. Dryer 2 has a dual track swirl inlet designed to produce high levels of turbulence in the immediate vicinity of the atomizer.

Dryer 2 exhibits an increased inlet air velocity and turbulence dissipation rates well above 1000 ($m^2/s^3$), with Kolmogorov lengths well below 100 micrometers.

Figure 11:
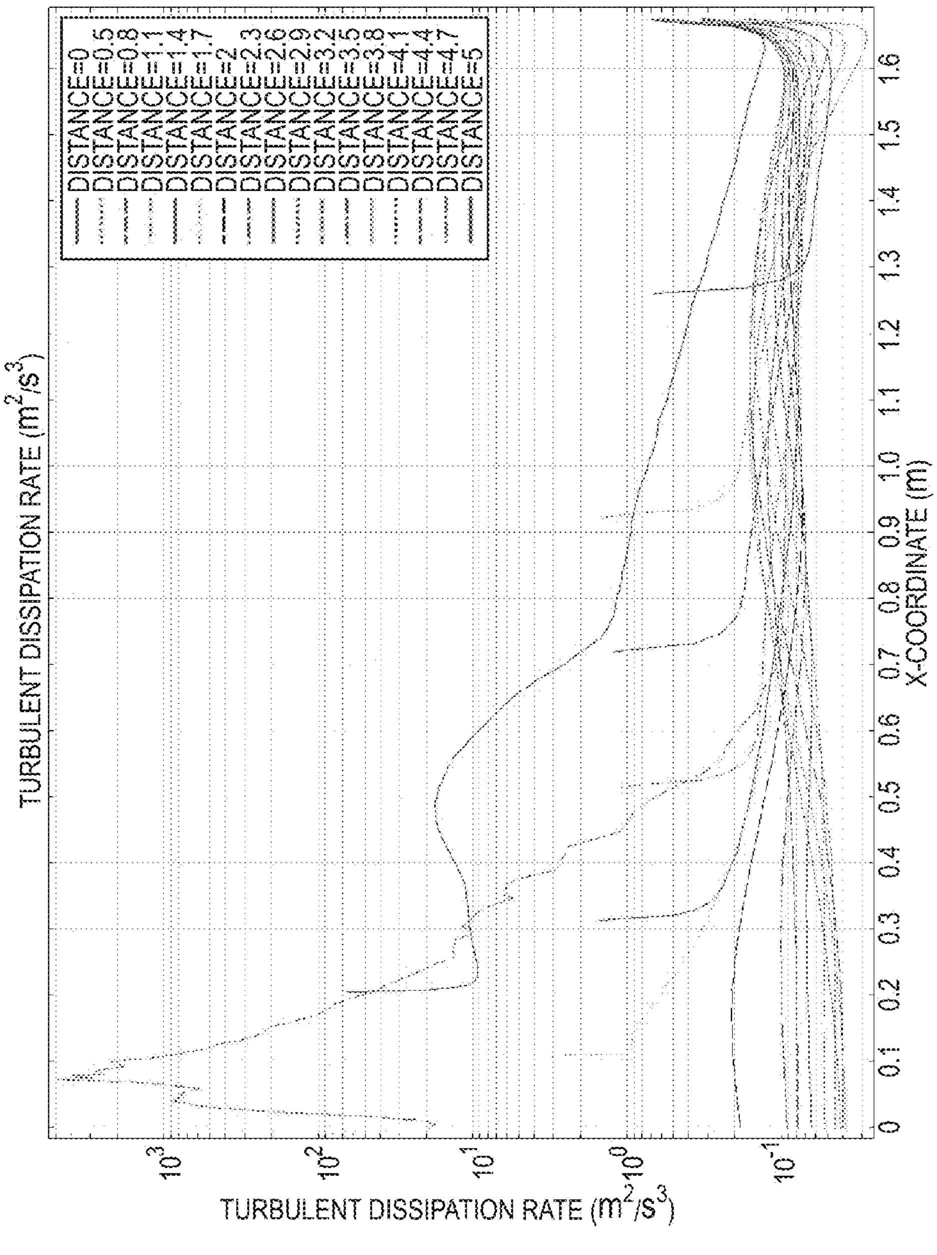
FIG. 11 is a graph of turbulent dissipation rate, in $m^2/sec^3$, as a function of radial distance in an interior volume of a spray drying vessel, at different vertical heights in such interior volume, for a first illustrative spray drying system (Dryer 1).
Figure 12:
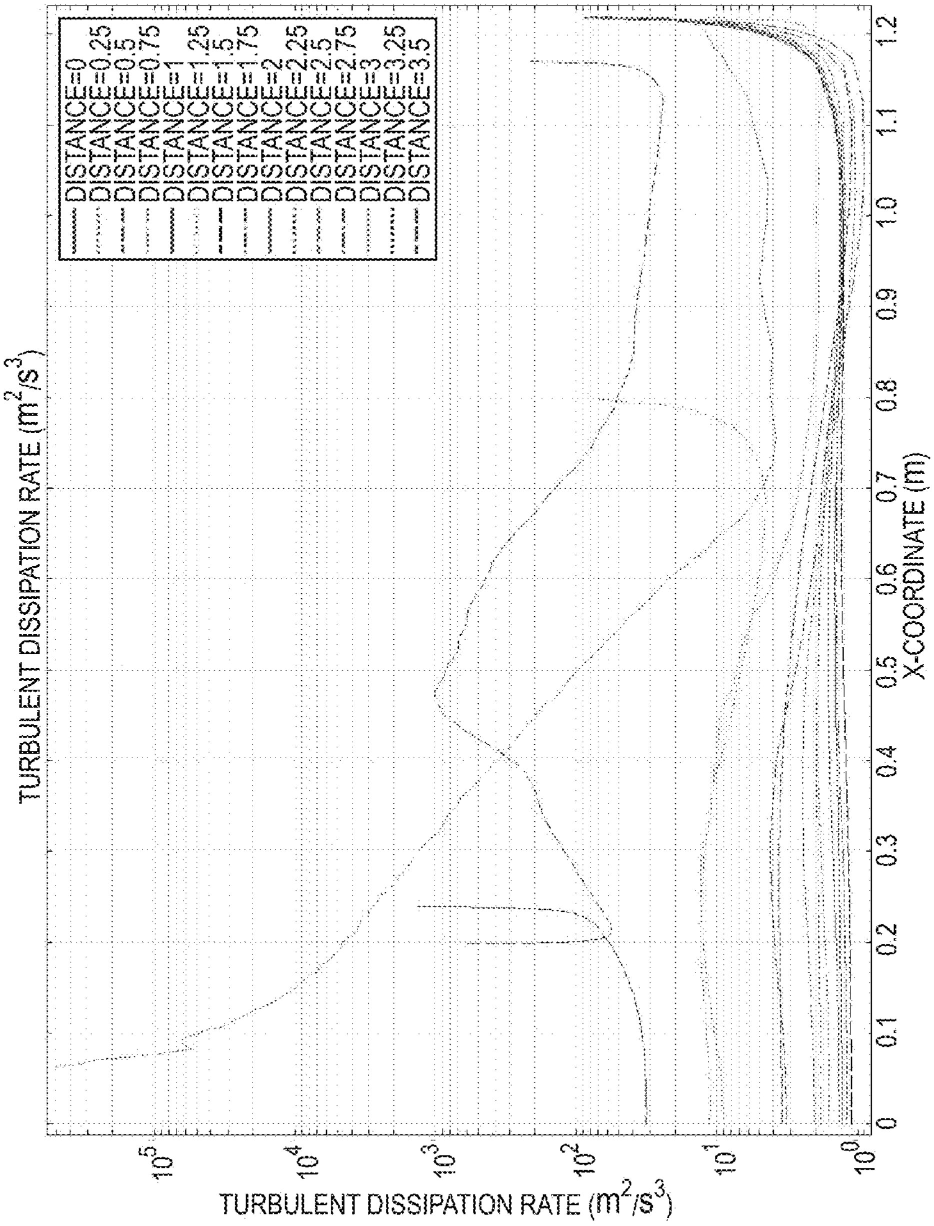
FIG. 12 is a graph of turbulent dissipation rate, in $m^2/sec^3$, as a function of radial distance in an interior volume of a spray drying vessel, at different vertical heights in such interior volume, for a second illustrative spray drying system (Dryer 2).

Graphs of the calculated radial distribution of the turbulence dissipation rate as a function of radius for both Dryer 1 and Dryer 2 are shown in FIGS. 11 and 12.

FIG. 11 is a graph of turbulent dissipation rate, in $m^2/sec^3$, as a function of radial distance in an interior volume of a spray drying vessel, at different vertical heights in such interior volume, for a first illustrative spray drying system (Dryer 1).

FIG. 12 is a graph of turbulent dissipation rate, in $m^2/sec^3$, as a function of radial distance in an interior volume of a spray drying vessel, at different vertical heights in such interior volume, for a second illustrative spray drying system (Dryer 2).

The turbulence dissipation rate in Dryer 2 is over two orders of magnitude larger than that in Dryer 1 at the peak region. The radial extent of the turbulent dissipation rate at values greater than 25 $m^2/s^3$ in the upper region of the dryer 1 is ~0.25 m from the dryer centerline, while it extends outward to >1 m for Dryer 2. At the highest levels of turbulent dissipation rate in Dryer 2, the Kolmogorov length is on the order of 9 micrometers, with the ratio $$\frac{\eta}{do_o} < 0.09$$

for 100 micrometer diameter particles.

The same fruit punch slurry was dried in both dryers. Dryer 1's highest run rate was 1.6 lb/min. Dryer 2's highest run rate was 2.4 lb/min, or 40% faster in 31.8% of the volume of Dryer 1 using 400 cfm less air flow. These results evidence the magnitude of enhancement that is achievable utilizing effective inducement of turbulence in the drying fluid.

Figure 13:
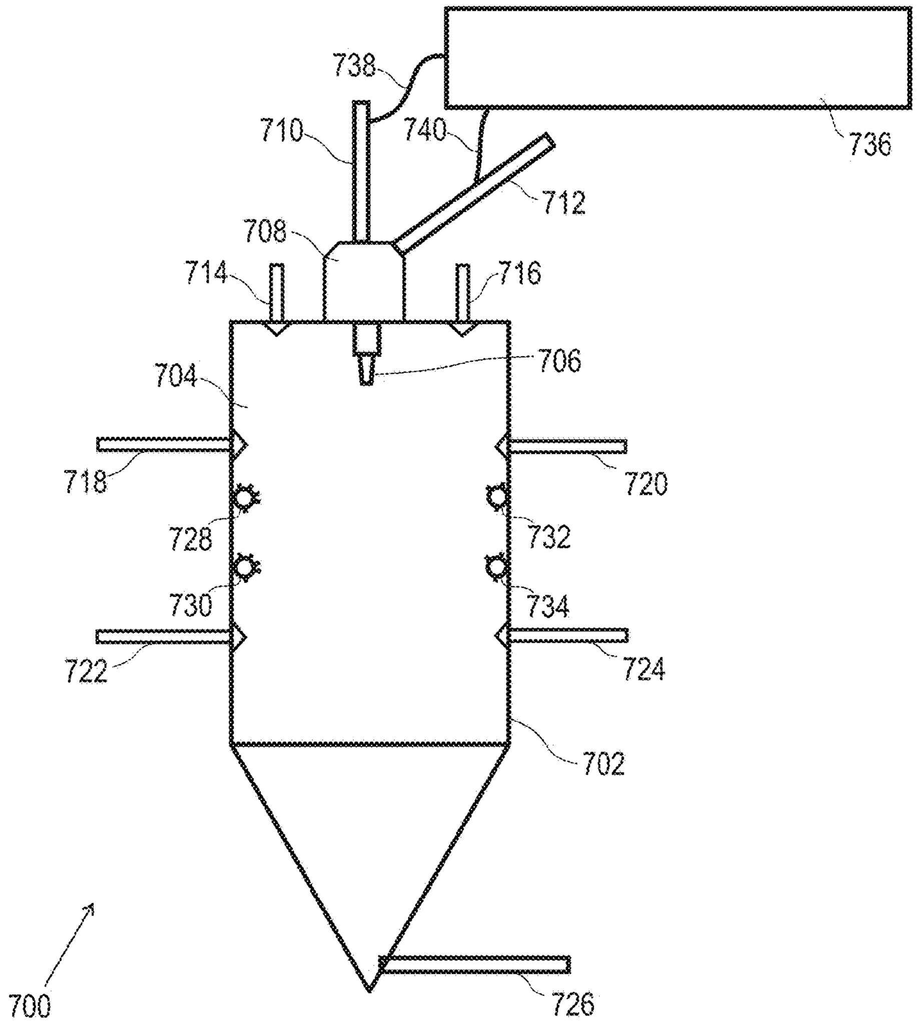
FIG. 13 is a schematic representation of a spray drying system according to a further embodiment of the present disclosure.

FIG. 13 is a schematic representation of a spray drying system 700 according to a further embodiment of the present disclosure.

The spray drying system 700 shown in FIG. 13 includes a spray drying vessel 702 with interior volume 704. In the interior volume is disposed an atomizer 706 depending downwardly from inlet feed assembly 708. The inlet feed assembly 708 includes spray dryable composition feed line 710 and drying fluid feed line 712, arranged so that the spray dryable composition is flowed from a suitable source (not shown in FIG. 13) through feed line 710 to the atomizer 706. The atomizer operates to generate an atomized spray-dryable composition discharged into the interior volume 704 of the spray dryer vessel 702. The drying fluid feed line 712 flows drying fluid from a source (not shown) through the inlet feed assembly 708 to the interior volume 704 of the spray dryer vessel 702.

The spray dryer vessel 702 is equipped with a plurality of jet nozzle injectors 714, 716, 718, 720, 722, and 724, each having a feedline joined to a source of secondary drying fluid. The jet nozzle injectors injected the secondary drying fluid at suitable flow rate and pressure conditions to induce turbulence in the primary drying fluid in the interior volume 704.

In addition to the jet nozzle injectors, the spray dryer vessel 702 also includes a series of wall-mounted turbulators 728, 730, 732, and 734, which are sized and shaped to cause turbulence in the drying fluid contacting them during flow of the drying fluid through the interior volume of the vessel. At the lower end of the conical lower portion of the vessel is an effluent discharge line 726, by which spray-dried material and effluent drying fluid or discharged from the vessel. The spray dried material and effluent drying fluid may be passed to a cyclone separator in which the spray dried material is recovered from the effluent drying fluid, with the effluent drying fluid then being processed for recycle in the system, in whole or part, if desired, or alternatively being vented from the system, with fresh drying fluid being introduced as above described.

The spray drying system shown in FIG. 13 further comprises a process control unit 736 that is shown schematically with process control signal transmission lines 738 and 740, thereby schematically signifying that the process control unit is operatively linked with the delivery lines so as to regulate the flow rate of drying fluid into the interior volume and flow rate of the spray-dryable material to the atomizer so that interaction of the drying fluid with the at least one turbulator produces turbulence in the drying fluid having a Kolmogorov length less than average particle size of spray-dryable material droplets in the atomized spray-dryable material in the interior volume of the vessel. Such arrangement may thus include respective flow control valves in the spray dryable composition feed line 710 and drying fluid feedline 712 for such purpose.

Additionally, or alternatively, the process control unit may be adapted to regulate flow rate of drying fluid into the interior volume and flow rate of the spray-dryable material to the atomizer so that the average particle size of the spray-dryable material droplets in the atomized spray-dryable material in the interior volume of the vessel is in a range of from 50 to 300 μm.

Additionally, or alternatively, the process control unit may be adapted to regulate flow rate of drying fluid into the interior volume and flow rate of the spray-dryable material to the atomizer so that turbulence dissipation rate of such turbulence exceeds 25 $m^2/sec^3$.

The process control unit may be configured in any suitable manner, and may be constructed and arranged to conduct additional monitoring, sensing, and process control operations. The process control unit may be of any suitable type, and may for example comprise microprocessor(s), microcontroller(s), general or special purpose programmable computer(s), programmable logic controller(s), or the like, which are programmatically arranged for carrying out spray drying process operations by means of hardware, software, or firmware that is provided for such purpose in the process control unit. The process control unit may comprise memory that is of random-access, read-only, flash, or other character, and may comprise a database of operational protocols or other information for operational performance of the system.

It will be recognized that the use of induced turbulence in accordance with the present disclosure enables the achievement of highly effective spray drying operations for production of spray dried materials of widely varying characters. The use of induced turbulence may be employed to enable low temperature spray drying operation, e.g., spray drying operation at drying fluid inlet temperature below 100° C. or lower.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A spray drying system, comprising:

(a) a spray drying vessel comprising:

(i) an interior volume arranged to receive an atomized spray-dryable material and drying fluid for contacting of the atomized spray-dryable material with the drying fluid in the interior volume;

(ii) at least one drying fluid inlet by which the drying fluid is introduced into the interior volume for said contacting; and (iii) a spray-dried material outlet communicating with the interior volume, arranged to discharge spray-dried material and effluent drying fluid from the vessel;

(b) an atomizer adapted to receive a spray-dryable material and discharge the atomized spray-dryable material into the interior volume of the vessel for said contacting;

(c) at least one turbulator adapted to generate turbulence in the drying fluid in the interior volume of the vessel;

(d) a process control unit adapted to regulate flow rate of drying fluid into the interior volume and flow rate of the spray-dryable material to the atomizer so that interaction of the drying fluid with the at least one turbulator produces turbulence in the drying fluid having a Kolmogorov length less than average particle size of spray-dryable material droplets in the atomized spray-dryable material in the interior volume of the vessel.

2. The spray drying system of claim 1, wherein said turbulence is induced in at least 5 volume % of the volume of drying fluid in the interior volume of the vessel.

3. The spray drying system of claim 1, wherein said turbulence is induced in at least 5, 10, 15, 20, 25, 30, 35, 40, 45, 50, 55, 60, 65, 70, 75, 80, 85, 90, or 95 volume % of the volume of drying fluid in the interior volume of the vessel.

4. The spray drying system of claim 3, wherein said volume % of the volume of drying fluid in the interior volume of the vessel in which said turbulence is induced includes drying fluid in contact with the atomizer.

5. The spray drying system of claim 1, wherein the at least one turbulator includes one or more nozzles configured to inject pressurized secondary drying fluid into the interior volume of the vessel.

6. The spray drying system of claim 5, wherein the at least one turbulator includes an array of nozzles configured to inject pressurized secondary drying fluid into the interior volume of the vessel.

7. The spray drying system of claim 1, wherein the at least one turbulator comprises at least one selected from among twisted tapes, static mixer devices, airfoils, Brock turbulators, wire turbulators, coil turbulators, and wall protrusion turbulators.

8. The spray drying system of claim 1, wherein the atomizer comprises at least one selected from among nozzle atomizers, applied charge atomizers, nebulizers, rotary atomizers, and ultrasonic atomizers.

9. The spray drying system of claim 1, comprising a drying fluid source coupled to the at least one drying fluid inlet in drying fluid supply relationship with the spray drying vessel.

10. The spray drying system of claim 9, wherein the drying fluid source is constituted to supply the drying fluid to the at least one drying fluid inlet of the spray drying vessel, the drying fluid comprising air, oxygen-enriched air, oxygen, nitrogen, argon, krypton, neon, helium, or a gas mixture comprising two or more of the foregoing drying fluid species.

11. The spray drying system of claim 9, wherein the drying fluid source is constituted to supply the drying fluid to the at least one drying fluid inlet of the spray drying vessel at temperature below at least one of 120° C., 115° C., 110° C., 100° C., 95° C., 90° C., 85° C., 80° C., 75° C., 70° C., 65° C., 60° C., 55° C., 50° C., 45° C., 40° C., 35° C., 30° C., 25° C., and 20° C., and above freezing temperature of liquid to be volatilized for spray drying of the spray-dryable material.

12. The spray drying system of claim 9, wherein the drying fluid source is constituted to supply the drying fluid to the at least one drying fluid inlet of the spray drying vessel at temperature below 100° C., and above freezing temperature of liquid to be volatilized for spray drying of the spray-dryable material.

13. The spray drying system of claim 1, comprising a spray-dryable material source arranged in spray-dryable material supply relationship to the atomizer.

14. The spray drying system of claim 13, wherein the spray-dryable material source comprises the spray-dryable material in a carrier-free composition.

15. The spray drying system of claim 13, wherein the spray-dryable material source comprises the spray-dryable material in a carrier-comprising composition.

16. The spray drying system of claim 1, wherein the process control unit is adapted to regulate flow rate of drying fluid into the interior volume and flow rate of the spray-dryable material to the atomizer so that the average particle size of the spray-dryable material droplets in the atomized spray-dryable material in the interior volume of the vessel is in a range of from 50 to 300 μm.

17. The spray drying system of claim 1, wherein the process control unit is adapted to regulate flow rate of drying fluid into the interior volume and flow rate of the spray-dryable material to the atomizer so that turbulence dissipation rate of said turbulence exceeds 25 $m^2/sec^3$.

18. The spray drying system of claim 1, wherein the process control unit is adapted to produce intermittent turbulence in the drying fluid.

19. The spray drying system of claim 1, wherein the process control unit is adapted to produce continuous turbulence in the drying fluid.

20. The spray drying system of claim 1, as configured for electrostatic spray-drying.

21. A process for producing a spray-dried material, comprising:

generating an atomized spray-dryable material;

contacting the atomized spray-dryable material with drying fluid to form spray-dried material;

recovering the spray-dried material from the drying fluid; and during said contacting, inducing turbulence in the drying fluid having a Kolmogorov length less than average particle size of spray-dryable material droplets in the atomized spray-dryable material.

22. The process of claim 21, wherein said turbulence is induced in at least 5 volume % of the volume of drying fluid engaged in the contacting.

23. The process of claim 21, wherein said turbulence is induced in at least 5, 10, 15, 20, 25, 30, 35, 40, 45, 50, 55, 60, 65, 70, 75, 80, 85, 90, or 95 volume % of the volume of drying fluid engaged in the contacting.

24. The process of claim 21, wherein the turbulence is induced by injection of pressurized secondary drying fluid.

25. The process of claim 21, wherein the turbulence is induced by interaction of the drying fluid with a turbulator comprising at least one selected from among twisted tapes, static mixer devices, airfoils, Brock turbulators, wire turbulators, coil turbulators, and wall protrusion turbulators.

26. The process of claim 21, wherein the atomized spray-dryable material is generated by an atomizer comprising at least one selected from among nozzle atomizers, applied charge atomizers, nebulizers, rotary atomizers, and ultrasonic atomizers.

27. The process of claim 21, wherein the drying fluid comprises air, oxygen-enriched air, oxygen, nitrogen, argon, krypton, neon, helium, or a gas mixture comprising two or more of the foregoing drying fluid species.

28. The process of claim 21, wherein the drying fluid is introduced to the contacting at temperature below at least one of 120° C., 115° C., 110° C., 100° C., 95° C., 90° C., 85° C., 80° C., 75° C., 70° C., 65° C., 60° C., 55° C., 50° C., 45° C., 40° C., 35° C., 30° C., 25° C., and 20° C., and above freezing temperature of liquid to be volatilized to form the spray-dryable material.

29. The process of claim 21, wherein the average particle size of the spray-dryable material droplets in the atomized spray-dryable material in the contacting is in a range of from 50 to 300 μm.

30. The process of claim 21, wherein turbulence dissipation rate of the turbulence induced during said contacting exceeds 25 $m^2/sec^3$.

* * * * *